US012555940B2

(12) United States Patent
Tsukamoto

(10) Patent No.: US 12,555,940 B2
(45) Date of Patent: Feb. 17, 2026

(54) ELECTRICAL CONNECTOR AND ELECTRICAL CONNECTOR SET INCLUDING THE SAME

(71) Applicant: Murata Manufacturing Co., Ltd., Kyoto-fu (JP)

(72) Inventor: Hideki Tsukamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 342 days.

(21) Appl. No.: 18/065,553

(22) Filed: Dec. 13, 2022

(65) Prior Publication Data

US 2023/0216227 A1 Jul. 6, 2023

(30) Foreign Application Priority Data

Jan. 6, 2022 (JP) ................................ 2022-001183

(51) Int. Cl.

| | |
|---|---|
| ***H01R 13/05*** | (2006.01) |
| ***H01R 12/71*** | (2011.01) |
| ***H01R 13/03*** | (2006.01) |
| ***H01R 13/115*** | (2006.01) |

(52) U.S. Cl.

CPC ........... *H01R 13/05* (2013.01); *H01R 12/716* (2013.01); *H01R 13/03* (2013.01); *H01R 13/115* (2013.01)

(58) Field of Classification Search

CPC ...... H01R 13/05; H01R 12/716; H01R 13/03; H01R 13/115; H01R 13/6597; H01R 13/652; H01R 13/40

USPC .......................................................... 439/660

See application file for complete search history.

(56) References Cited

U.S. PATENT DOCUMENTS 8,758,029 B2 * 6/2014 Midorikawa ........ H01R 12/716 439/74
2006/0264074 A1 * 11/2006 Chang .................... H01R 12/57 439/74
2010/0190383 A1 * 7/2010 Yamada ............... H01R 13/641 439/680
2010/0291776 A1 * 11/2010 Huang ............... H01R 13/2457 439/74

(Continued)

FOREIGN PATENT DOCUMENTS

JP H04-054179 U 5/1992
JP 2002-530840 A 9/2002

(Continued)

*Primary Examiner* — Tulsidas C Patel
*Assistant Examiner* — Jeffrey Mountain
(74) *Attorney, Agent, or Firm* — Studebaker Brackett PLLC

(57) ABSTRACT

An electrical connector includes a holding member that is electrically insulating, and a signal terminal and a male ground terminal held by the holding member. The male ground terminal is disposed next to the signal terminal. The male ground terminal includes a first lengthwise extending part, a second lengthwise extending part opposed to the first lengthwise extending part, and a laterally connecting part connecting an end portion of the first lengthwise extending part and an end portion of the second lengthwise extending part. The male ground terminal projects in side view. The male ground terminal includes a connection path configured to electrically connect the first lengthwise extending part and the second lengthwise extending part.

18 Claims, 19 Drawing Sheets

(56) References Cited

U.S. PATENT DOCUMENTS

| | | | | |
|---|---|---|---|---|
| 2013/0330943 | A1* | 12/2013 | Sasaki .................. | H01R 12/716 439/74 |
| 2014/0227899 | A1* | 8/2014 | Tanaka ............... | H01R 13/6275 439/345 |
| 2016/0181713 | A1* | 6/2016 | Peloza ................... | H01R 12/73 439/630 |

FOREIGN PATENT DOCUMENTS

| | | | | |
|---|---|---|---|---|
| JP | 2008-226524 | A | | 9/2008 |
| JP | 2011003393 | A | * | 1/2011 |
| JP | 6924222 | B2 | | 8/2021 |

* cited by examiner

ELECTRICAL CONNECTOR AND ELECTRICAL CONNECTOR SET INCLUDING THE SAME

CROSS-REFERENCE TO RELATED APPLICATION

This application claims benefit of priority to Japanese Patent Application No. 2022-001183, filed Jan. 6, 2022, the entire content of which is incorporated herein by reference.

BACKGROUND

Technical Field

The present disclosure relates to an electrical connector and an electrical connector set including the electrical connector.

Background Art

For example, Japanese Unexamined Patent Application Publication No. 2011-3393 discloses a connector in which a ground contact is disposed at a central part in alignment of a plurality of signal contacts. The ground contact in Japanese Unexamined Patent Application Publication No. 2011-3393 is in a P-shape and has a cavity area extending therethrough at the center. Japanese Patent No. 6924222 discloses a connector which adjusts an impedance by a cavity area provided to a terminal. The cavity area of the terminal in Japanese Patent No. 6924222 is formed between an end part and a contact part of the terminal.

SUMMARY

When a distance between adjacent signal terminals is increased in order to prevent interference of signals between the adjacent signal terminals, there is a problem in that a connector becomes larger in size. Further, also when a U-shaped ground terminal is disposed between the adjacent signal terminals, there is a problem in that sufficient isolation characteristics cannot be obtained due to a cavity area formed at the U-shaped ground terminal.

In this respect, the present disclosure provides an electrical connector and an electrical connector set including the electrical connector, which can obtain sufficient isolation characteristics without the connector being increased in size.

An electrical connector according to an aspect of the present disclosure includes a holding member that is electrically insulating, and a signal terminal and a male ground terminal held by the holding member. The male ground terminal is disposed next to the signal terminal. The male ground terminal includes a first lengthwise extending part, a second lengthwise extending part opposed to the first lengthwise extending part, and a laterally connecting part connecting an end portion of the first lengthwise extending part and an end portion of the second lengthwise extending part. The male ground terminal projects in side view. The male ground terminal includes a connection path configured to electrically connect the first lengthwise extending part and the second lengthwise extending part.

According to the present disclosure, in the male ground terminal projecting in side view, the first lengthwise extending part, the second lengthwise extending part, the laterally connecting part, and the connection path form a resonance path. Therefore, sufficient isolation characteristics can be obtained without the connector being increased in size.

DETAILED DESCRIPTION

Hereinafter, embodiments of an electrical connector 20 and an electrical connector set 1 including the electrical connector 20 according to the present disclosure are described with reference to the drawings. In each of the drawings, an X axis, a Y axis, and a Z axis which are orthogonal to each other are illustrated for convenience. Herein, a longitudinal direction, a transverse direction, and a height direction of a male holding member 21 of the male-type electrical connector 20 are respectively defined as an X-axis direction, a Y-axis direction, and a Z-axis direction.

Note that, in this disclosure, a phrase "a connection path electrically connecting" means that "the connection path establishes physical connection by extending continuously" and "the connection path establishes electrical connection in a high-frequency band when the connection path is physically separated by a small gap being provided therein".

Figure 1:
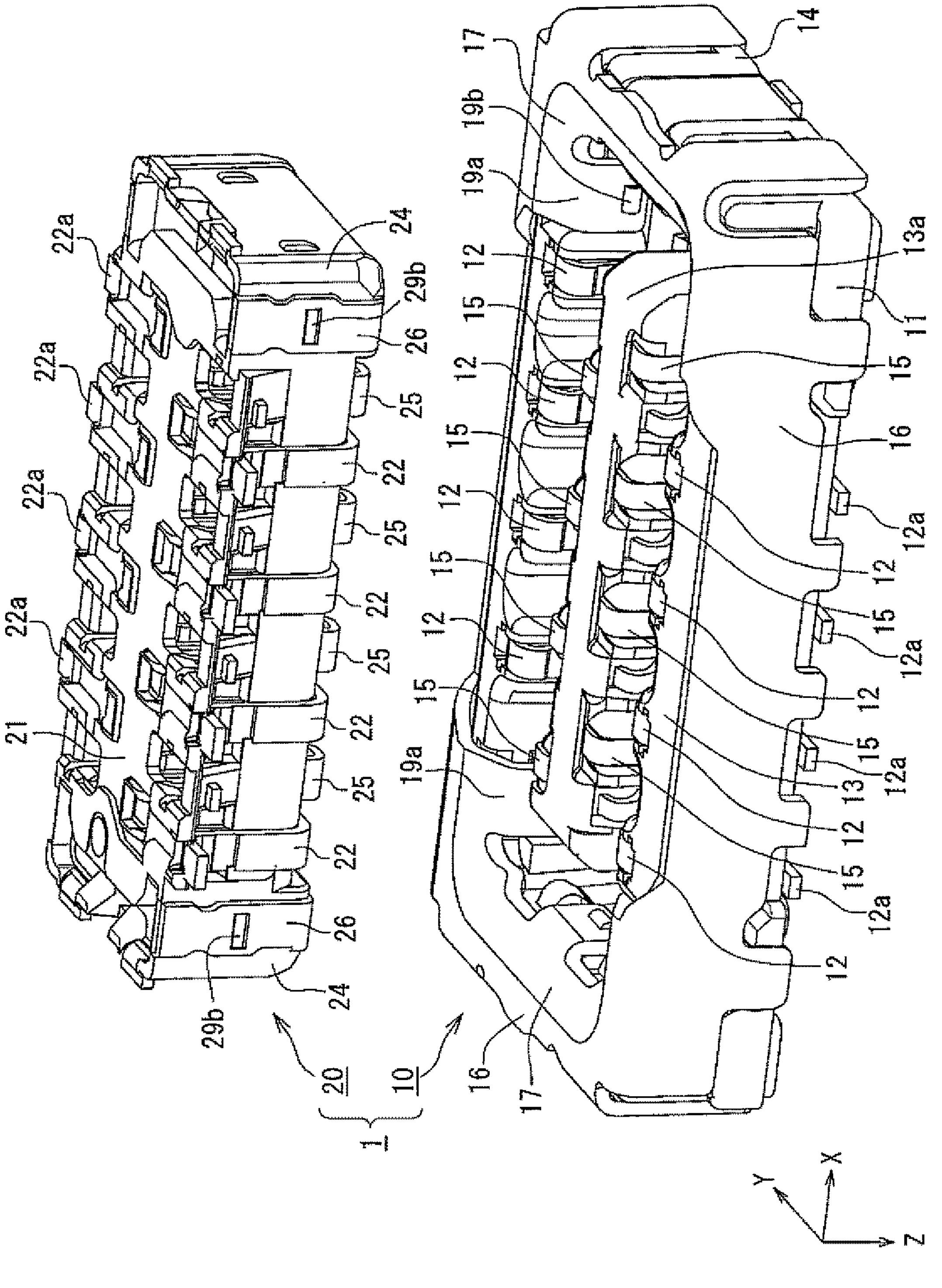
FIG. 1 is a perspective view of an electrical connector set according to one embodiment.
Figure 2:
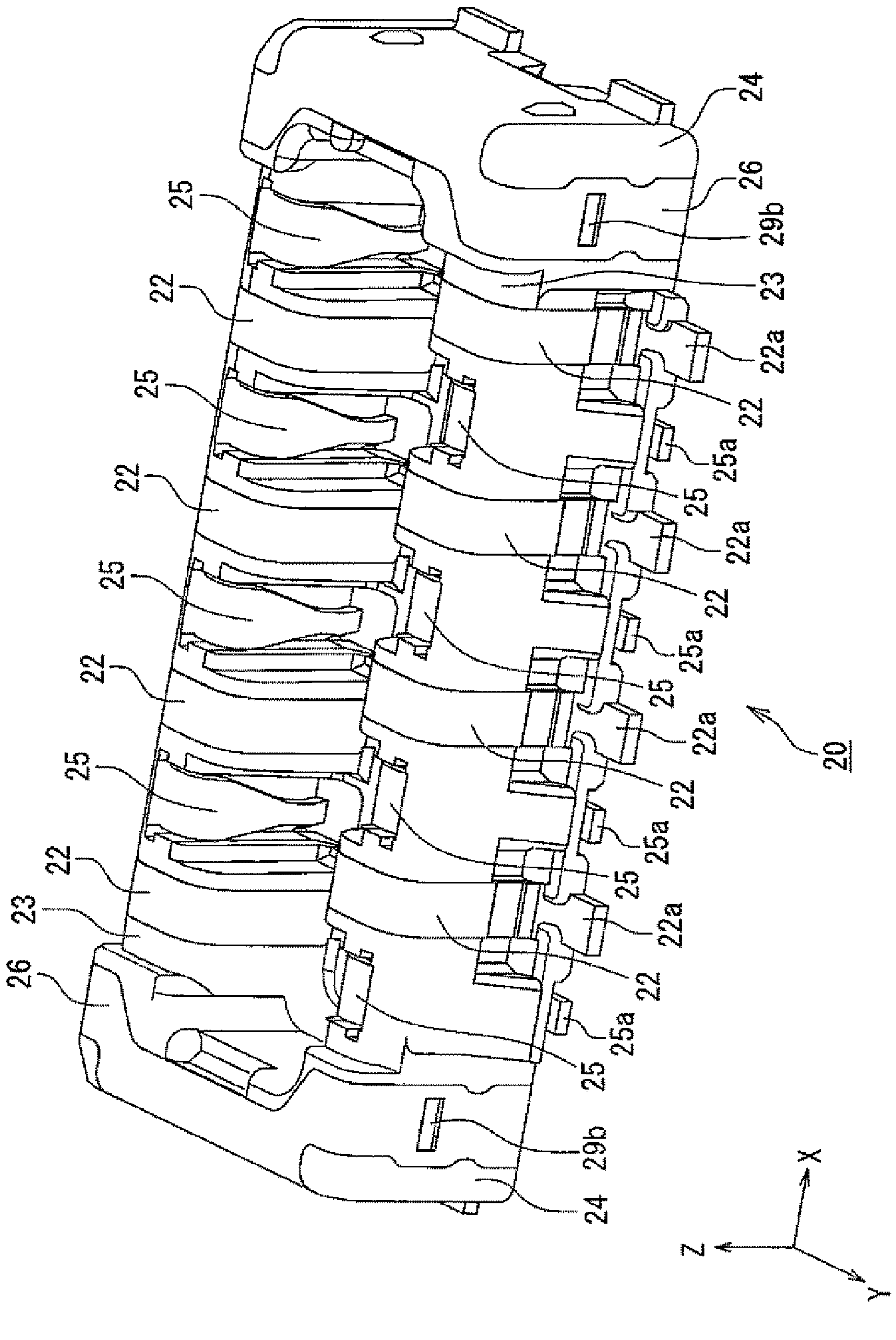
FIG. 2 is a perspective view of a male-type electrical connector constituting the electrical connector set illustrated in FIG. 1.
Figure 3:
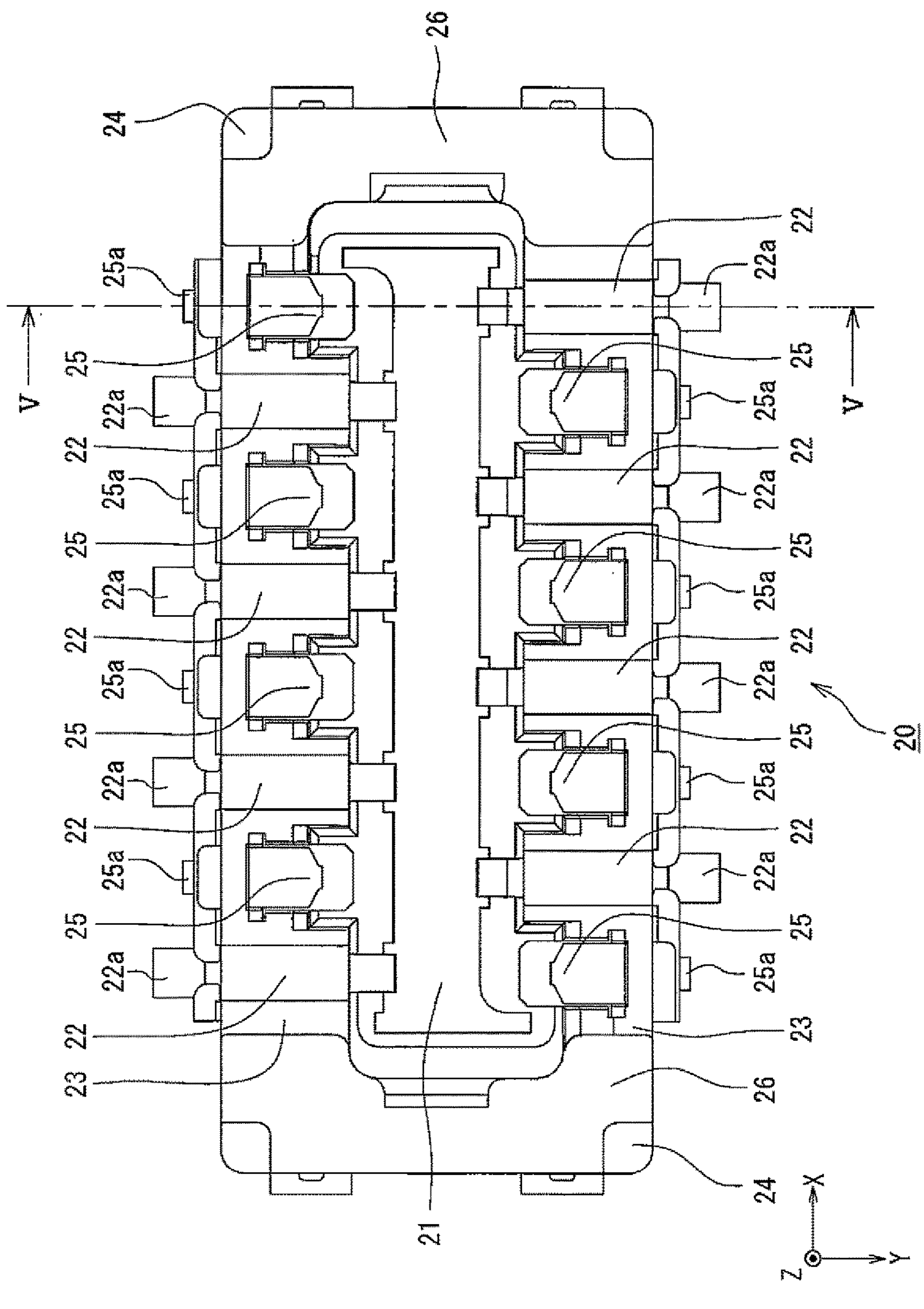
FIG. 3 is a plan view of the male-type electrical connector illustrated in FIG. 2.
Figure 4:
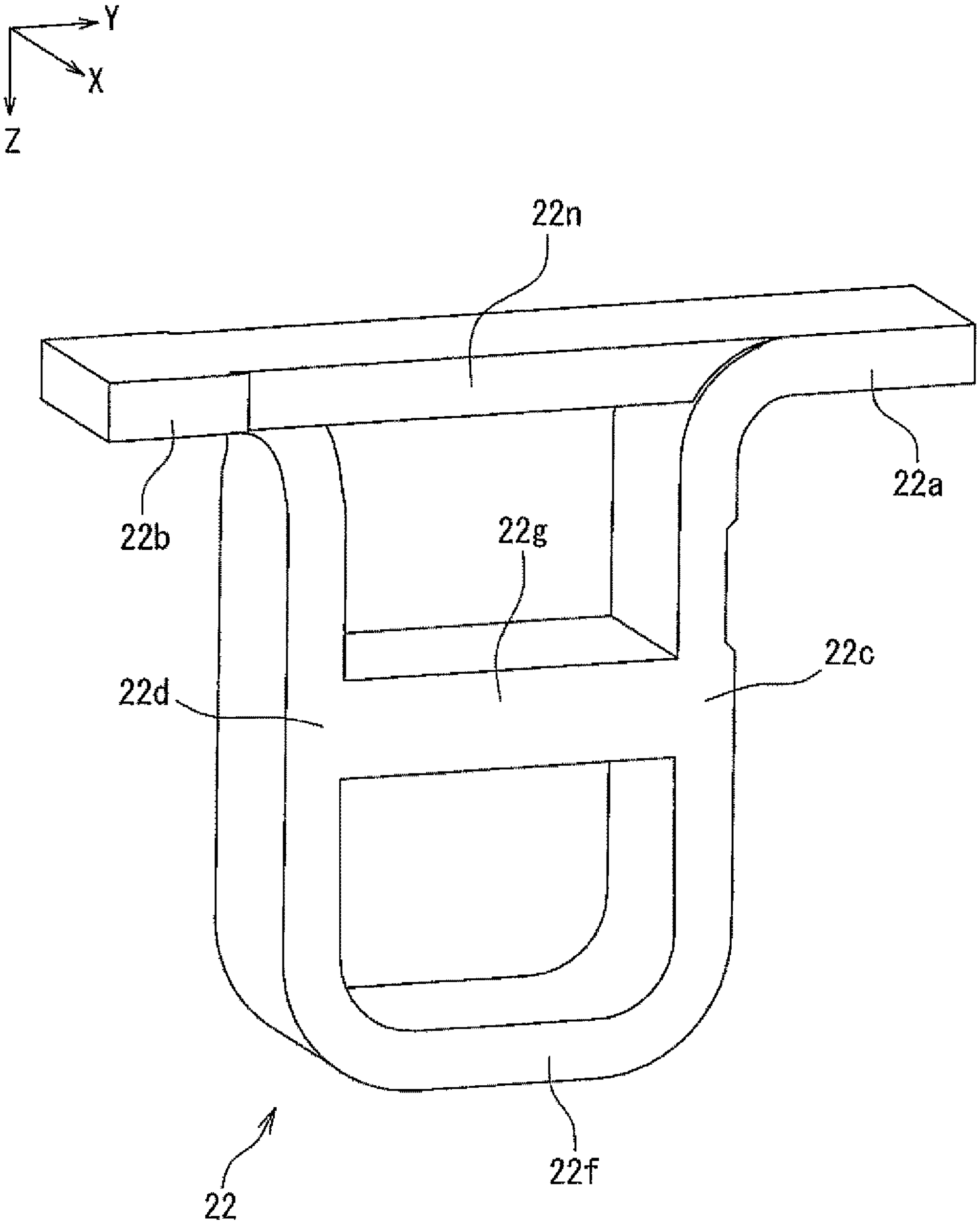
FIG. 4 is a perspective view of a male ground terminal according to Embodiment 1 of the male-type electrical connector illustrated in FIG. 2.
Figure 5:
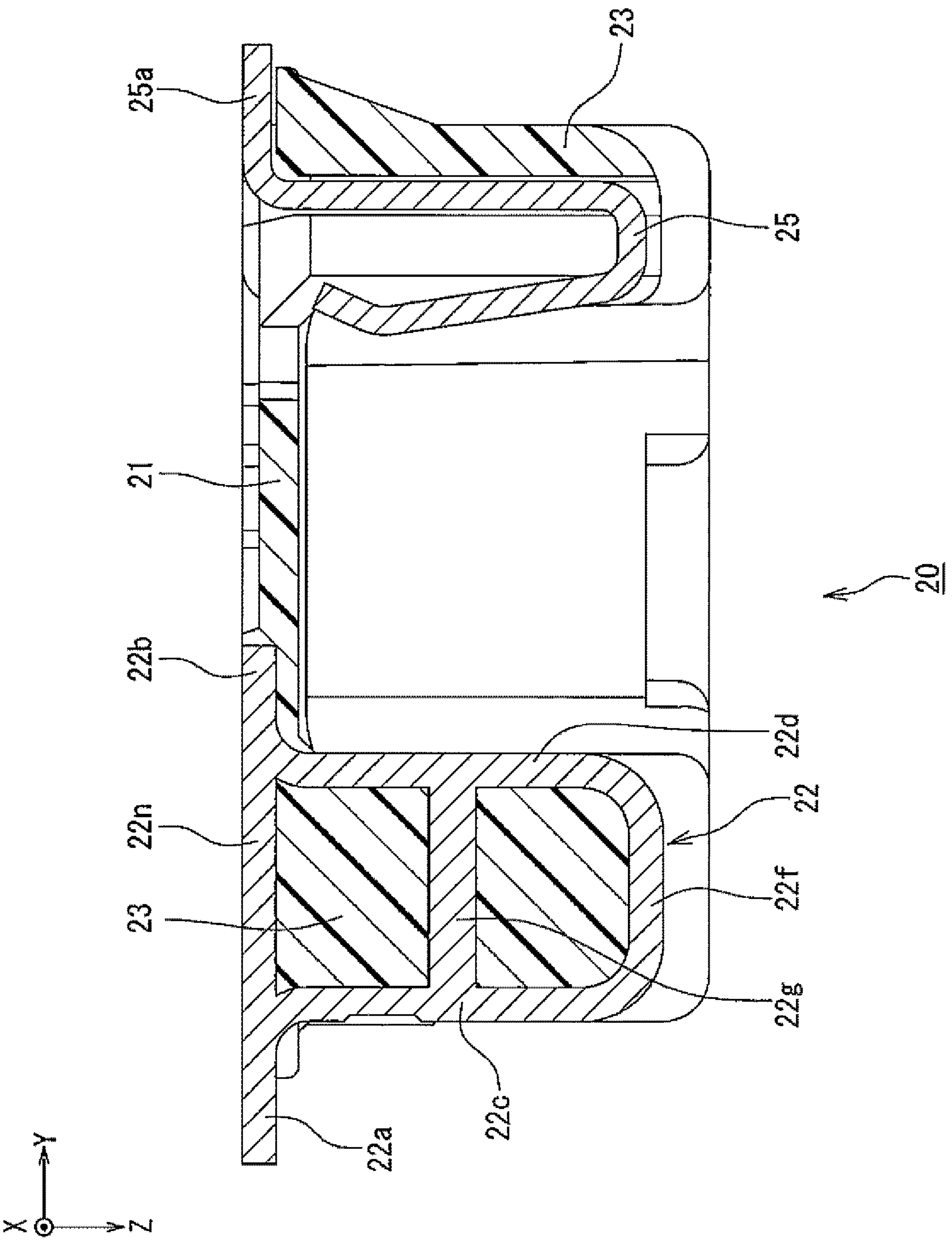
FIG. 5 is a sectional view of the male-type electrical connector illustrated in FIG. 3 taken along line V-V.

FIG. 1 is a perspective view of the electrical connector set 1 according to one embodiment. FIG. 2 is a perspective view of the male-type electrical connector 20 constituting the electrical connector set 1 illustrated in FIG. 1. FIG. 3 is a plan view of the male-type electrical connector 20 illustrated in FIG. 2. FIG. 4 is a perspective view of a male ground terminal 22 according to Embodiment 1 of the male-type electrical connector 20 illustrated in FIG. 2. FIG. 5 is a sectional view of the male-type electrical connector 20 illustrated in FIG. 3 taken along line V-V.

Electrical Connector Set

As illustrated in FIG. 1, the electrical connector set 1 includes a female-type electrical connector 10 and the male-type electrical connector 20. The electrical connector set 1 is configured such that by the male-type electrical connector 20 being moved in the height direction (insertion-and-removal direction) toward the female-type electrical connector 10 in a state where the male-type electrical connector 20 faces the female-type electrical connector 10, the female-type electrical connector 10 and the male-type electrical connector 20 are mated with each other. Note that, in this disclosure, the overall size of the male-type electrical connector 20 is smaller than the overall size of the female-type electrical connector 10 and the male-type electrical connector 20 is configured to be accommodated and fitted in the female-type electrical connector 10.

Female-Type Electrical Connector

A configuration of the female-type electrical connector 10 is described with reference to FIG. 1.

The female-type electrical connector 10 includes a female holding member (holding member) 11, a female ground terminal (inner terminal) 12, a female signal terminal (inner terminal) 15, and a female outer terminal (outer terminal) 16. As the female holding member 11, for example, an electrically-insulating resin such as liquid crystal polymer is used. The female holding member 11 has a rectangular shape extending in the longitudinal direction and the transverse direction in plan view. The female holding member 11 includes two female terminal side-holding parts (terminal holding parts) 13, and two female side-supporting parts 14. The two female terminal side-holding parts 13 extend in the longitudinal direction, and are mutually separated in the transverse direction. The two female side-supporting parts 14 are disposed at both end portions in the longitudinal direction so as to be mutually separated.

A female terminal middle-holding part 13*a* has a plurality of female signal terminal attachment parts each in a concave shape, and the female terminal side-holding part 13 has a plurality of female ground terminal attachment parts each in a concave shape. The female signal terminal 15 is held by being attached to the female signal terminal attachment part of the female terminal middle-holding part 13*a*. The female ground terminal 12 is held by being attached to the female ground terminal attachment part of the female terminal side-holding part 13. The female signal terminal 15 is disposed next to the female ground terminal 12. For example, the female ground terminals 12 and the female signal terminals 15 are alternately disposed in the alignment direction of the terminals (in the longitudinal direction). The female ground terminal 12 corresponds one-to-one with the male ground terminal 22 (described later), and establishes electrical connection by being insertably and removably engaged with the corresponding male ground terminal 22. The female signal terminal 15 corresponds one-to-one with a male signal terminal 25 (described later), and establishes electrical connection by being engaged with the corresponding male signal terminal 25.

In the female-type electrical connector 10 illustrated in FIG. 1, the plurality of (for example, four) female signal terminals 15 arranged in a row in the alignment direction of the terminals (in the longitudinal direction) are disposed as each of a first row and a second row in the transverse direction so that the first and second rows are separated from each other in the transverse direction. In this configuration, many female signal terminals 15 can be disposed within a range of the female terminal side-holding part 13 having a limited size. Note that the arrangement of the plurality of female signal terminals 15 is not limited to be in two rows (for example, the first row and the second row), but may be in one row, or three or more rows. Further, the number of female signal terminals 15 in one row is not limited to four, but may be three or less, or five or more.

The female signal terminal 15 is a conductor connected to a signal potential, and is configured by a stick-like member having conductivity being bent. For example, phosphor bronze may be used as the female signal terminal 15. Phosphor bronze is elastically deformable material having conductivity. For example, gold plating or the like may be applied to a surface of the female signal terminal 15. The female signal terminal 15 includes a female signal mounted part (not illustrated) to be mounted on a land electrode of a circuit board (not illustrated). The female signal mounted part is formed at a side end in the transverse direction and a lower end in the height direction (insertion-and-removal direction).

The female ground terminal (inner terminal) 12 is provided in order to suppress interference of an electromagnetic wave between the two female signal terminals 15 adjacent to each other in the longitudinal direction (that is, in order to isolate the rows of the female signal terminals 15 from each other). The female ground terminal 12 is disposed between the two female signal terminals 15 adjacent to each other in the longitudinal direction, and serves as a female shielding terminal. For example, the female signal terminal 15 is held by being attached to the female signal terminal attachment part in a concave shape. The female signal terminal 15 extends in the transverse direction.

The female ground terminal 12 is a conductor connected to a ground potential, and is configured by a stick-like member having conductivity being bent. For example, phosphor bronze may be used as the female ground terminal 12. Phosphor bronze is elastically deformable material having conductivity. For example, gold plating or the like may be applied to a surface of the female ground terminal 12. The female ground terminal 12 includes a female ground mounted part (base mounted part) 12*a* to be mounted on a land electrode of a circuit board (not illustrated). The female ground mounted part 12*a* is formed at a side end in the longitudinal direction.

The female outer terminal 16 has a rectangular frame-like shape which is circumferentially closed so as to surround the plurality of female ground terminals 12 and the plurality of female signal terminals 15 when seen in the height direction (insertion-and-removal direction). In the female outer terminal 16 having the rectangular frame-like shape, a long side extends in the longitudinal direction and a short side extends in the transverse direction. Here, the term "circumferentially" is not necessarily limited to a polygonal circumference, but may be, for example, a circular circumference, an ellipse circumference, or a shape combining a polygonal circumference and a circular circumference.

The female outer terminal 16 is a conductor connected to a ground potential. The female outer terminal 16 is connected to the ground potential so that it blocks an electromagnetic wave from outside and unwanted radiation from the female signal terminal 15, and makes a space surrounded by the female outer terminal 16 be an electromagnetically shielded space. That is, the female outer terminal 16 is a member which surrounds the female signal terminal 15 in order to electromagnetically shield the female signal terminal 15. For example, phosphor bronze may be used as the female outer terminal 16. Phosphor bronze is elastically deformable material having conductivity. The female outer terminal 16 is formed through bending, for example.

The female side-supporting part 14 of the female holding member 11 supports a corresponding female outer side part of the female outer terminal 16 while the female outer side part being attached thereto. The female outer side part has a plurality of female outer mounted parts to be mounted on a ground electrode of a circuit board (not illustrated). The female outer mounted part is formed at a lower end in the height direction (insertion-and-removal direction).

The female outer terminal 16 includes two female outer side parts, two female outer extending parts, two guides 17, an attachment cavity, and a female contact wall part 19*a*. The female outer side parts are respectively provided to a first side portion and a second side portion in the longitudinal direction. The female outer extending parts each extends in the longitudinal direction to connect the two female outer side parts.

On an inner surface of the female contact wall part 19*a*, a female contact latching part 19*b* in a shape inwardly projecting in the transverse direction is formed. In the mated state of the female-type electrical connector 10 and the male-type electrical connector 20, the female contact latching part 19*b* in the convex shape in the female outer terminal 16 latches with a male contact latching part 29*b* in a concave shape in a male outer terminal 26 (described later). In this configuration, secure mating can be achieved without affecting the female ground terminal 12, the female signal terminal 15, or the like. Note that the female contact latching part 19*b* serves as a contact part which electrically connects the female outer terminal 16 and the male outer terminal 26.

The female outer side part has a substantially U-shape when seen in the height direction (insertion-and-removal direction). The guide 17 provided to the female outer side part has a substantially U-shape when seen in the height direction (insertion-and-removal direction), and has a shape downwardly inclined from an outer side portion to an inner side portion. The guide 17 is used as a guide which securely guides the male outer terminal 26 to the attachment cavity when the male-type electrical connector 20 is inserted into the female-type electrical connector 10 in the height direction (insertion-and-removal direction). The attachment cavity is a cavity formed inside the guide 17, and has a substantially rectangular shape when seen in the height direction (insertion-and-removal direction).

Male-Type Electrical Connector

A configuration of the male-type electrical connector (electrical connector) 20 is described with reference to FIGS. 2 and 3.

As illustrated in FIG. 2, the male-type electrical connector 20 includes the male holding member (holding member) 21, the male ground terminal (inner terminal) 22, the male signal terminal (inner terminal, the signal terminal) 25, and the male outer terminal (outer terminal) 26. As the male holding member 21, for example, an electrically-insulating resin such as liquid crystal polymer is used. The male holding member 21 has a rectangular shape extending in the longitudinal direction and the transverse direction. The male holding member 21 includes two male terminal holding parts (terminal holding parts) 23, and two male side-supporting parts 24. The two male terminal holding parts 23 extend in the longitudinal direction, and are mutually separated in the transverse direction. The two male side-supporting parts 24 are disposed at both end portions of the male-type electrical connector 20 in the longitudinal direction so as to be mutually separated.

The male terminal holding part 23 of the male holding member 21 has a plurality of male signal terminal attachment parts each in a concave shape. The male signal terminal 25 is held by being attached to the male signal terminal attachment part. The plurality of male ground terminals 22 are held by the male terminal holding part 23 of the male holding member 21. The male ground terminal 22 is disposed next to the male signal terminal 25. For example, the plurality of male ground terminals 22 and the plurality of male signal terminals 25 are alternately arranged in the alignment direction of the terminals (in the longitudinal direction). The male ground terminal 22 corresponds one-to-one with the above-described female ground terminal 12, and establishes electrical connection by being engaged with the corresponding female ground terminal 12 in the mated state of the electrical connector set 1. The male signal terminal 25 corresponds one-to-one with the above-described female signal terminal 15, and establishes electrical connection by being engaged with the corresponding female signal terminal 15 in the mated state of the electrical connector set 1.

In the male-type electrical connector 20 illustrated in FIG. 2, the plurality of (for example, four) male ground terminals 22 and male signal terminals 25 alternately arranged in the alignment direction of the terminals (in the longitudinal direction). The male ground terminals 22 and the male signal terminals 25 are disposed as each of a first row and a second row in the transverse direction so that the first and second rows are separated from each other in the transverse direction.

The male signal terminal 25 is a conductor connected to a signal potential, and is configured by a stick-like member having conductivity being bent. For example, phosphor bronze may be used as the male signal terminal 25. Phosphor bronze is elastically deformable material having conductivity. For example, gold plating or the like may be applied to a surface of the male signal terminal 25. The male signal terminal 25 includes a male signal mounted part 25*a* to be mounted on a land electrode of a circuit board (not illustrated). The male signal mounted part 25*a* is formed at a side end in the transverse direction and a lower end in the height direction (insertion-and-removal direction). For example, the male signal terminal 25 is held by being attached to the male signal terminal attachment part in a concave shape. The male signal terminal 25 extends in the transverse direction.

The male ground terminal 22 is provided in order to suppress interference of an electromagnetic wave between two male signal terminals 25 adjacent to each other in the alignment direction of the terminals (in the longitudinal direction) (that is, in order to isolate the rows of the male signal terminals 25 from each other). The male ground terminal 22 is disposed between the two male signal terminals 25 adjacent to each other in the longitudinal direction, and serves as a male shielding terminal. For example, the male ground terminal 22 is held through insert molding with the male terminal holding part 23. The male ground terminal 22 extends in the transverse direction.

The male ground terminal 22 is a conductor connected to a ground potential, and is made by a stick-like member having conductivity being bent or a plate-like member having conductivity being punched. For example, phosphor bronze may be used as the male ground terminal 22. Phosphor bronze is elastically deformable material having conductivity. For example, gold plating or the like may be applied to a surface of the male ground terminal 22. The male ground terminal 22 includes a first male ground mounted part 22*a* and a second male ground mounted part 22*b* to be mounted on ground electrodes of a circuit board (not illustrated). The first male ground mounted part 22*a* is formed at a side end in the transverse direction and a lower end in the height direction (insertion-and-removal direction).

The two male outer terminals 26 are disposed to be separated from each other at both end portions in the longitudinal direction when seen in the height direction (insertion-and-removal direction). The male side-supporting part 24 of the male holding member 21 supports the corresponding male outer terminal 26 while the male outer terminal 26 being attached thereto. The male outer terminal 26 has a plurality of male outer mounted parts to be mounted on a ground electrode of a circuit board (not illustrated). The male outer mounted part is formed at a lower end in the height direction (insertion-and-removal direction).

The male outer terminal 26 is a conductor connected to a ground potential. The male outer terminal 26 is connected to the ground potential so that it blocks an electromagnetic wave from outside and unwanted radiation from the male signal terminal 25, and makes a space surrounded by the male outer terminal 26 be an electromagnetically shielded space. That is, the male outer terminal 26 is a member which surrounds the male signal terminal 25 in order to electromagnetically shield the male signal terminal 25. For example, phosphor bronze may be used as the male outer terminal 26. Phosphor bronze is elastically deformable material having conductivity. The male outer terminal 26 is formed through bending, for example.

In the mated state of the female-type electrical connector 10 and the male-type electrical connector 20, the female contact latching part 19*b* in the convex shape in the female outer terminal 16 described above latches with the male contact latching part 29*b* in a concave shape in the male outer terminal 26. In this configuration, secure mating can be achieved without affecting the male ground terminal 22, the male signal terminal 25, or the like. Note that the male contact latching part 29*b* serves as a contact part which electrically connects the female outer terminal 16 and the male outer terminal 26.

Male Ground Terminal According to Embodiment 1

Figure 16:
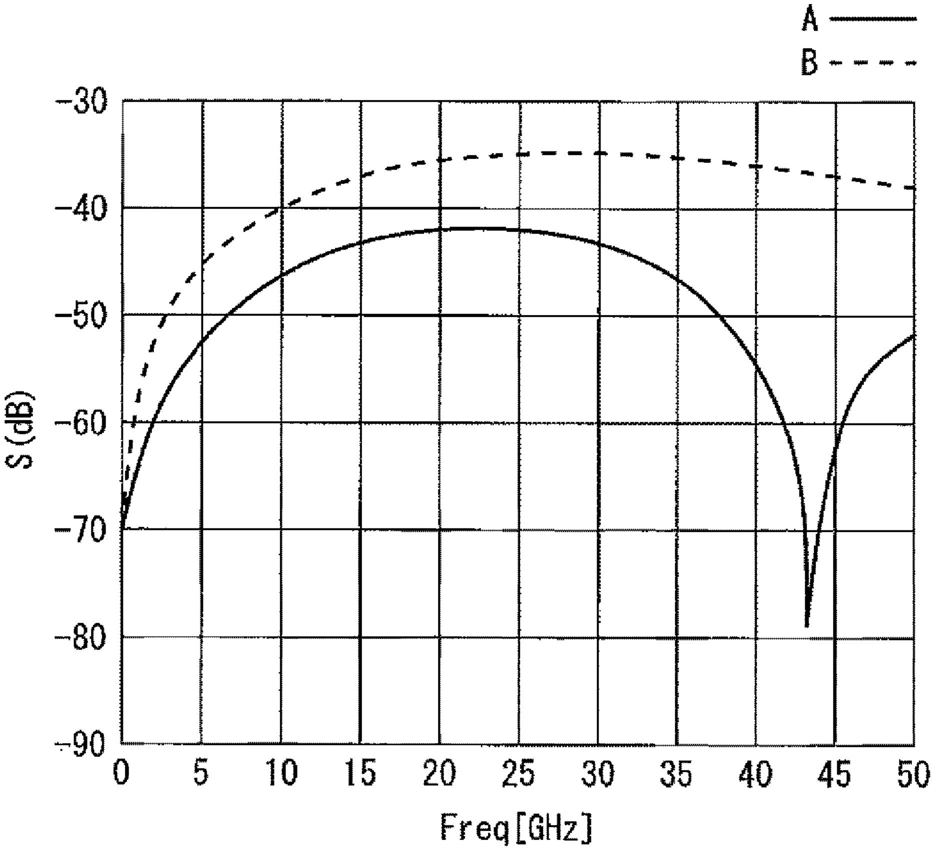
FIG. 16 is a graph showing a measurement result comparing the male ground terminal according to Embodiment 1 and a male ground terminal according to a conventional technique.

A configuration and operation of the male ground terminal 22 according to Embodiment 1 of the male-type electrical connector 20 are described with reference to FIGS. 4, 5, and 16. FIG. 16 is a graph showing a measurement result comparing the male ground terminal 22 according to Embodiment 1 and a male ground terminal (not illustrated) according to a conventional technique.

As illustrated in FIGS. 4 and 5, the male ground terminal 22 projects in a U-shape in side view. The male ground terminal 22 includes the first male ground mounted part 22*a*, the second male ground mounted part 22*b*, a first lengthwise extending part 22*c*, a second lengthwise extending part 22*d*, a laterally connecting part 22*f*, a connection path 22*g*, and a laterally extending part 22*n*.

The first male ground mounted part 22*a* is a male ground mounted part positioned on the upper side and on a first side in FIG. 4. The second male ground mounted part 22*b* is a male ground mounted part positioned on the upper side and on a second side in FIG. 4 to be opposed to the first male ground mounted part 22*a*. The first male ground mounted part 22*a* and the second male ground mounted part 22*b* extend in a lateral direction (transverse direction) orthogonal to the alignment direction of the male ground terminals 22.

The first lengthwise extending part 22*c* is positioned on the first side and extends in the lengthwise direction (height direction) while being connected to the first male ground mounted part 22*a*. The second lengthwise extending part 22*d* is positioned on the second side and extends in the lengthwise direction (height direction) to be opposed to the first lengthwise extending part 22*c* while being connected to the second male ground mounted part 22*b*.

The laterally connecting part 22*f* connects an end portion of the first lengthwise extending part 22*c* on the opposite side from the first male ground mounted part 22*a* (on the lower side in FIG. 4) to an end portion of the second lengthwise extending part 22*d* on the opposite side from the second male ground mounted part 22*b* (on the lower side in FIG. 4), and extends in the lateral direction (transverse direction) orthogonal to the alignment direction of the male ground terminals 22.

The laterally extending part 22*n* connects the first male ground mounted part 22*a* to the second male ground mounted part 22*b*, and extends in the lateral direction (transverse direction). By the laterally extending part 22*n* being added, another resonance path constituted by the first lengthwise extending part 22*c*, the second lengthwise extending part 22*d*, the connection path 22*g*, and the laterally extending part 22*n* is formed.

The connection path 22*g* connects the first lengthwise extending part 22*c* to the second lengthwise extending part 22*d*, and extends in the lateral direction (transverse direction) along the laterally connecting part 22*f* in side view. Therefore, a frequency at which an attenuation pole appears can be easily controlled. For example, the connection path 22*g* extends in the lateral direction (transverse direction) in parallel to the laterally connecting part 22*f*. The connection path 22*g* is located between the laterally connecting part 22*f* and the laterally extending part 22*n* in the lengthwise direction (height direction). The connection path 22*g* is flush with the first lengthwise extending part 22*c* and the second lengthwise extending part 22*d* in the alignment direction (longitudinal direction) of the male ground terminals 22. Therefore, making the male ground terminal 22 having the connection path 22*g* becomes easier.

As illustrated in FIG. 4, the connection path 22*g* is positioned almost at the middle between the laterally connecting part 22*f* and the laterally extending part 22*n* in the lengthwise direction (height direction), and physically connects the first lengthwise extending part 22*c* and the second lengthwise extending part 22*d*. In other words, the connection path 22*g* is positioned almost at the center of the male ground terminal 22 in the lengthwise direction (height direction), and electrically connects the first lengthwise extending part 22*c* and the second lengthwise extending part 22*d*. In the male ground terminal 22 having a U-shape illustrated in FIGS. 4 and 5, the first lengthwise extending part 22*c*, the second lengthwise extending part 22*d*, the laterally connecting part 22*f*, and the connection path 22*g* form a resonance path.

FIG. 16 shows a result in measurement of an S parameter of the male-type electrical connector 20 by a network analyzer. The measurement of the S parameter is conducted as follows. The female-type electrical connector 10 and the male-type electrical connector 20 mounted on a substrate (not illustrated) are prepared, and they are mated together. Assume that a line led from one male signal terminal 25 is a port 1 and a line led from a male signal terminal 25 adjacent to the one male signal terminal 25 is a port 2. Further, assume that a line led from one female signal terminal 15 connected to the one male signal terminal 25 is a port 3 and a line led from an adjacent female signal terminal 15 connected to the adjacent male signal terminal 25 is a port 4. Then, bandpass characteristics between the port 1 and the port 2 are measured.

In FIG. 16, a solid line A indicates a measurement result of the male-type electrical connector 20 including the male ground terminal 22 according to Embodiment 1. A horizontal axis is indicative of a frequency (GHz) and a vertical axis is indicative of attenuation (dB) of a transmission signal. As illustrated in FIG. 16, an attenuation pole appears at approximately 43 GHz, and cross talk in a high-frequency band (for example, in a GHz band) is suppressed. Note that a broken line B indicates a case of a male-type electrical connector including a male ground terminal (a male ground terminal projecting in a U-shape in side view without the connection path 22*g* being provided) according to a conventional technique (not illustrated) as a comparative example.

Therefore, in the male ground terminal 22 projecting in a U-shape in side view, by the connection path 22*g* being provided, the resonance path is formed by the first lengthwise extending part 22*c*, the second lengthwise extending part 22*d*, the laterally connecting part 22*f*, and the connection path 22*g*. Thus, sufficient isolation characteristics can be obtained without the connector being increased in size.

Male Ground Terminal According to Embodiment 2

Figure 17:
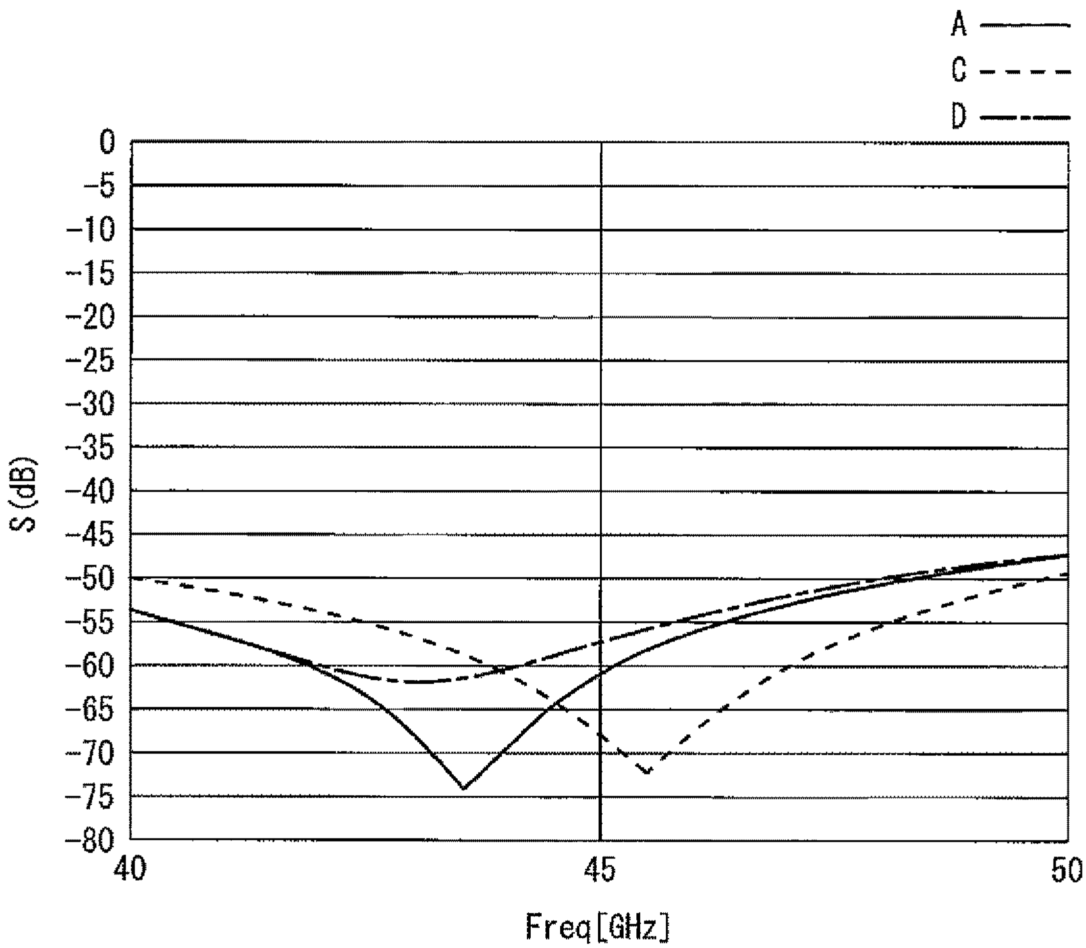
FIG. 17 is a graph showing a measurement result comparing the male ground terminal according to Embodiment 1, the male ground terminal according to Embodiment 2, and the male ground terminal according to Embodiment 3.

A configuration and operation of the male ground terminal 22 according to Embodiment 2 of the male-type electrical connector 20 are described with reference to FIGS. 6 and 17. FIG. 17 is a graph showing a measurement result comparing the male ground terminal 22 according to Embodiment 1 (solid line A), the male ground terminal 22 according to Embodiment 2 (broken line C), and the male ground terminal 22 according to Embodiment 3 (one-dot chain line D).

The male ground terminal 22 according to Embodiment 2 is described below, focusing on differences from the male ground terminal 22 according to Embodiment 1 illustrated in FIG. 4.

Figure 6:
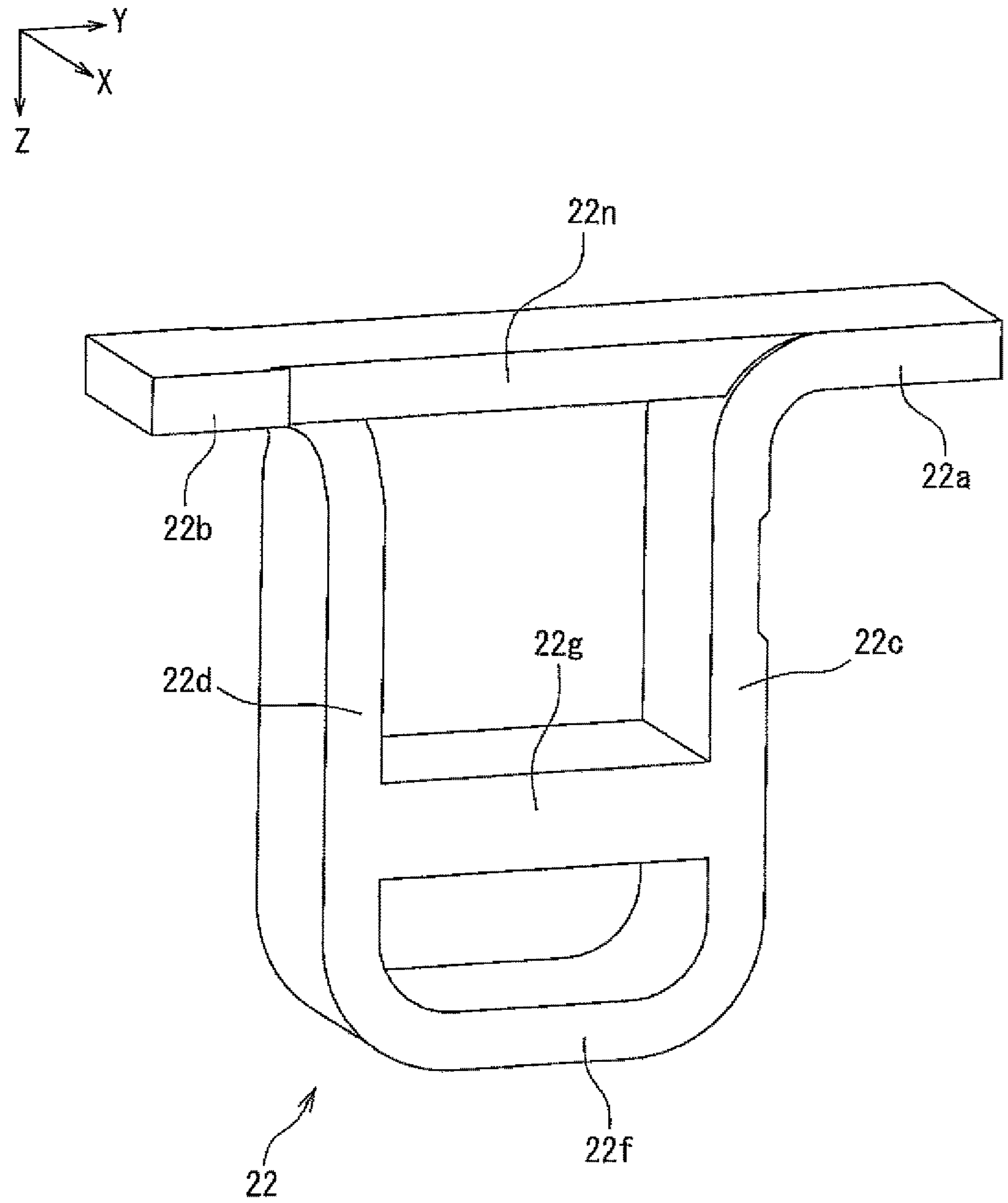
FIG. 6 is a perspective view of a male ground terminal according to Embodiment 2.

As illustrated in FIG. 6, the male ground terminal 22 includes the connection path 22*g* connecting the first lengthwise extending part 22*c* to the second lengthwise extending part 22*d* and extending in the lateral direction (transverse direction) along the laterally connecting part 22*f*. For example, the connection path 22*g* extends in the lateral direction (transverse direction) in parallel to the laterally connecting part 22*f*. The connection path 22*g* is flush with the first lengthwise extending part 22*c* and the second lengthwise extending part 22*d* in the alignment direction (longitudinal direction) of the male ground terminals 22, and they have the same thickness.

As illustrated in FIG. 6, the connection path 22*g* is positioned on a side closer to the laterally connecting part 22*f* with respect to the middle position between the laterally connecting part 22*f* and the laterally extending part 22*n* in the lengthwise direction (height direction). The connection path 22*g* physically connects the first lengthwise extending part 22*c* and the second lengthwise extending part 22*d*. In other words, the connection path 22*g* electrically connects the first lengthwise extending part 22*c* and the second lengthwise extending part 22*d*. In the male ground terminal 22 having a U-shape illustrated in FIG. 6, the first lengthwise extending part 22*c*, the second lengthwise extending part 22*d*, the laterally connecting part 22*f*, and the connection path 22*g* form a resonance path.

FIG. 17 shows a measurement result of an S parameter in a measurement method and measurement conditions similarly to the male ground terminal 22 according to Embodiment 1. In FIG. 17, a horizontal axis is indicative of a frequency (GHz) and a vertical axis is indicative of attenuation (dB) of a transmission signal.

In FIG. 17, the solid line A indicates a measurement result of the male ground terminal 22 according to Embodiment 1, and the broken line C indicates a measurement result of the male ground terminal 22 according to Embodiment 2. As indicated by the broken line C in FIG. 17, an attenuation pole appears at approximately 45.5 GHZ, and cross talk in a high-frequency band (for example, in a GHz band) is suppressed.

Therefore, in the male ground terminal 22 projecting in a U-shape in side view, by the connection path 22*g* being provided, the resonance path is formed by the first lengthwise extending part 22*c*, the second lengthwise extending part 22*d*, the laterally connecting part 22*f*, and the connection path 22*g*. Thus, sufficient isolation characteristics can be obtained without the connector being increased in size.

Note that when compared with the male ground terminal 22 (having the connection path 22*g* positioned almost at the center in the lengthwise direction (height direction)) according to Embodiment 1 indicated by the solid line in FIG. 17, the attenuation pole of the male ground terminal 22 according to Embodiment 2 is shifted to a higher-frequency side. Therefore, by the position of the connection path 22*g* being changed in the lengthwise direction (height direction) in the male ground terminal 22, the frequency at which the attenuation pole appears can be controlled.

Male Ground Terminal According to Embodiment 3

A configuration and operation of the male ground terminal 22 according to Embodiment 3 of the male-type electrical connector 20 are described with reference to FIGS. 7 and 17.

The male ground terminal 22 according to Embodiment 3 is described below, focusing on differences from the male ground terminal 22 according to Embodiment 1 illustrated in FIG. 4.

Figure 7:
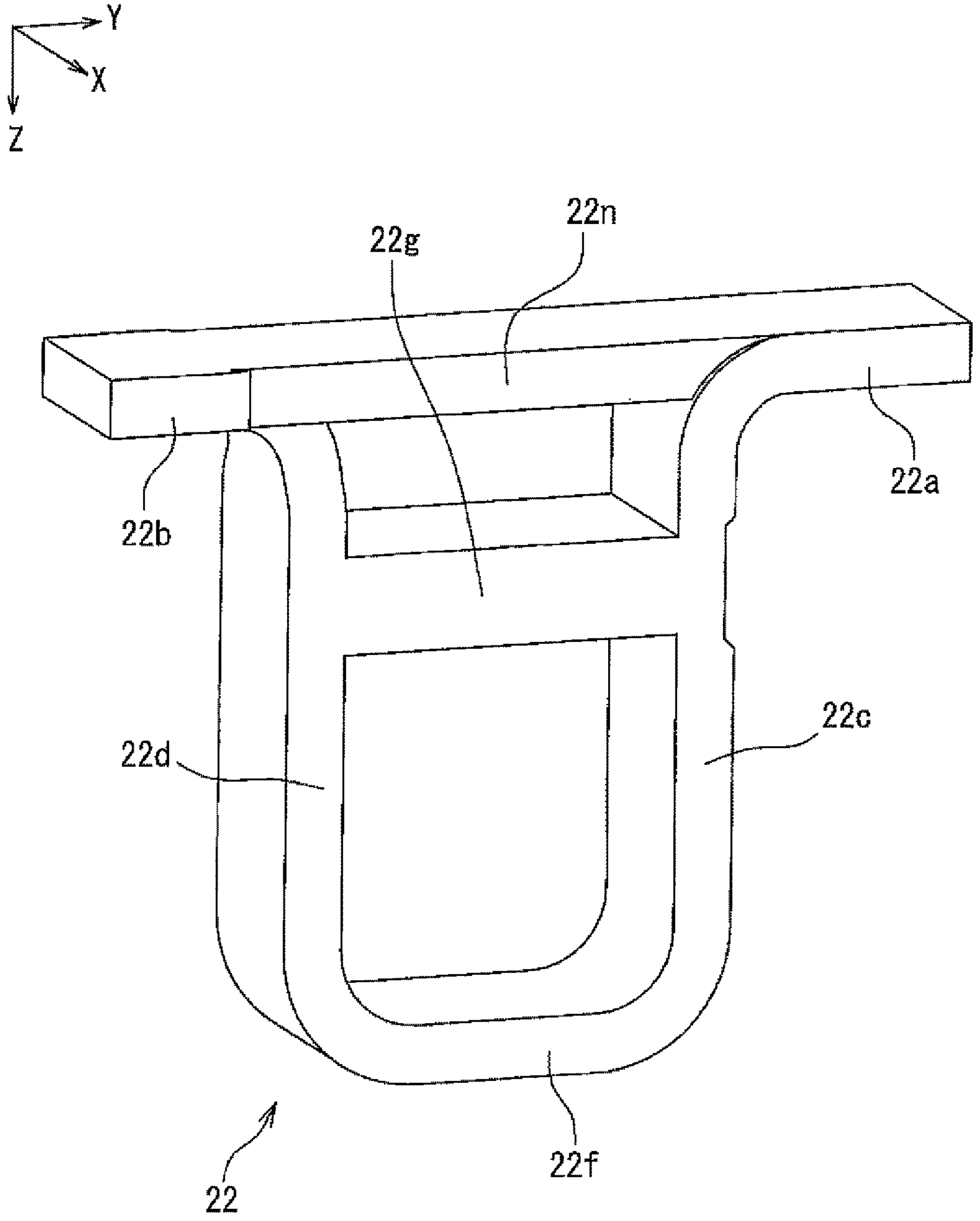
FIG. 7 is a perspective view of a male ground terminal according to Embodiment 3.

As illustrated in FIG. 7, the male ground terminal 22 includes the connection path 22*g* connecting the first lengthwise extending part 22*c* to the second lengthwise extending part 22*d* and extending in the lateral direction (transverse direction) along the laterally connecting part 22*f*. For example, the connection path 22*g* extends in the lateral direction (transverse direction) in parallel to the laterally connecting part 22*f*. The connection path 22*g* is flush with the first lengthwise extending part 22*c* and the second lengthwise extending part 22*d* in the alignment direction (longitudinal direction) of the male ground terminals 22, and they have the same thickness.

As illustrated in FIG. 7, the connection path 22*g* is positioned on a side closer to the first male ground mounted part 22*a* and the second male ground mounted part 22*b* with respect to the middle position between the laterally connecting part 22*f* and the laterally extending part 22*n* in the lengthwise direction (height direction). The connection path 22*g* physically connects the first lengthwise extending part 22*c* and the second lengthwise extending part 22*d*. In other words, the connection path 22*g* electrically connects the first lengthwise extending part 22*c* and the second lengthwise extending part 22*d*. In the male ground terminal 22 having a U-shape illustrated in FIG. 7, the first lengthwise extending part 22*c*, the second lengthwise extending part 22*d*, the laterally connecting part 22*f*, and the connection path 22*g* form a resonance path.

In FIG. 17, the solid line indicates a measurement result of the male ground terminal 22 according to Embodiment 1, and the one-dot chain line D indicates a measurement result of the male ground terminal 22 according to Embodiment 3. As indicated by the one-dot chain line D in FIG. 17, an attenuation pole appears at approximately 43.2 GHZ, and cross talk in a high-frequency band (for example, in a GHz band) is suppressed.

Therefore, in the male ground terminal 22 projecting in a U-shape in side view, by the connection path 22*g* being provided, the resonance path is formed by the first lengthwise extending part 22*c*, the second lengthwise extending part 22*d*, the laterally connecting part 22*f*, and the connection path 22*g*. Thus, sufficient isolation characteristics can be obtained without the connector being increased in size.

Note that when compared with the male ground terminal 22 (having the connection path 22*g* positioned almost at the center in the lengthwise direction (height direction)) according to Embodiment 1 indicated by the solid line in FIG. 17, the attenuation pole of the male ground terminal 22 according to Embodiment 3 is shifted to a lower-frequency side. Therefore, by the position of the connection path 22*g* being changed in the lengthwise direction (height direction) in the male ground terminal 22, the frequency at which the attenuation pole appears can be controlled.

Male Ground Terminal According to Embodiment 4

A configuration and operation of the male ground terminal 22 according to Embodiment 4 of the male-type electrical connector 20 are described with reference to FIG. 8.

The male ground terminal 22 according to Embodiment 4 is described below, focusing on differences from the male ground terminal 22 according to Embodiment 1 illustrated in FIG. 4.

Figure 8:
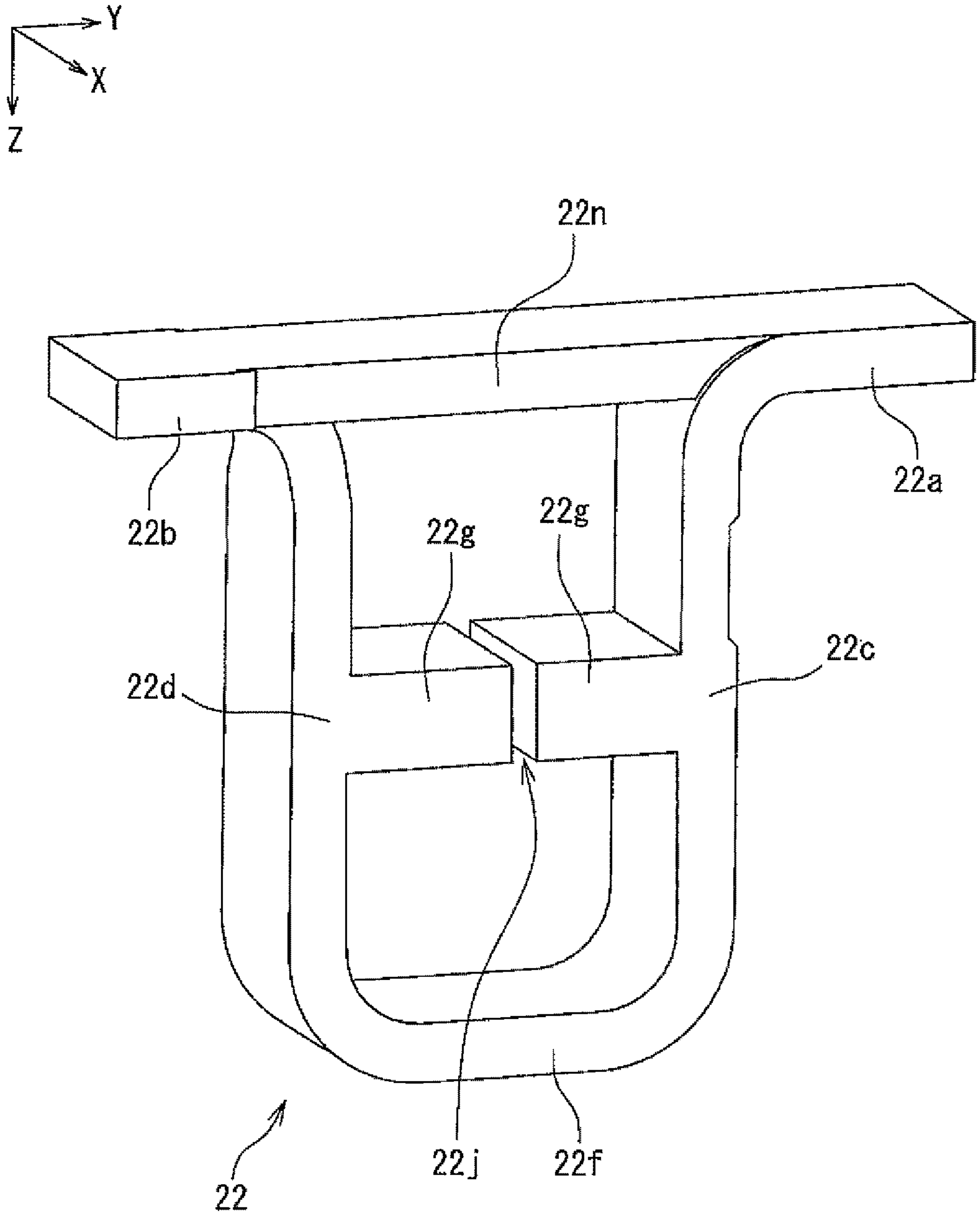
FIG. 8 is a perspective view of a male ground terminal according to Embodiment 4.

As illustrated in FIG. 8, the male ground terminal 22 includes the connection path 22*g* connecting the first lengthwise extending part 22*c* to the second lengthwise extending part 22*d* and extending in the lateral direction (transverse direction) along the laterally connecting part 22*f*. For example, the connection path 22*g* extends in the lateral direction (transverse direction) in parallel to the laterally connecting part 22*f*. The connection path 22*g* is flush with the first lengthwise extending part 22*c* and the second lengthwise extending part 22*d* in the alignment direction (longitudinal direction) of the male ground terminals 22, and they have the same thickness.

As illustrated in FIG. 8, the connection path 22*g* has a gap 22*j* at an intermediate part thereof. For example, the connection path 22*g* has a gap 22*j* that allows electrical connection almost at a center position in the lateral direction (transverse direction). The gap 22*j* has a small space in the lateral direction (transverse direction). The connection path 22*g* is divided into two by the gap 22*j*. The connection path 22*g* is physically separated by the gap 22*j*. However, the connection path 22*g* is electrically connectable through the gap 22*j* with the small space in the lateral direction (transverse direction) (that is, by capacitive coupling). In other words, the connection path 22*g* electrically connects the first lengthwise extending part 22*c* and the second lengthwise extending part 22*d* in a high-frequency band (for example, in a GHz band). Therefore, a degree of freedom of the connection path 22*g* increases. In the male ground terminal 22 having a U-shape illustrated in FIG. 8, the first lengthwise extending part 22*c*, the second lengthwise extending part 22*d*, the laterally connecting part 22*f*, the connection path 22*g*, and the gap 22*j* form a resonance path.

Therefore, in the male ground terminal 22 projecting in a U-shape in side view, by the connection path 22*g* having the gap 22*j* being provided, the resonance path is formed by the first lengthwise extending part 22*c*, the second lengthwise extending part 22*d*, the laterally connecting part 22*f*, and the connection path 22*g*. Thus, sufficient isolation characteristics can be obtained without the connector being increased in size.

Male Ground Terminal According to Embodiment 5

A configuration and operation of the male ground terminal 22 according to Embodiment 5 of the male-type electrical connector 20 are described with reference to FIG. 9.

The male ground terminal 22 according to Embodiment 5 is described below, focusing on differences from the male ground terminal 22 according to Embodiment 1 illustrated in FIG. 4.

Figure 9:
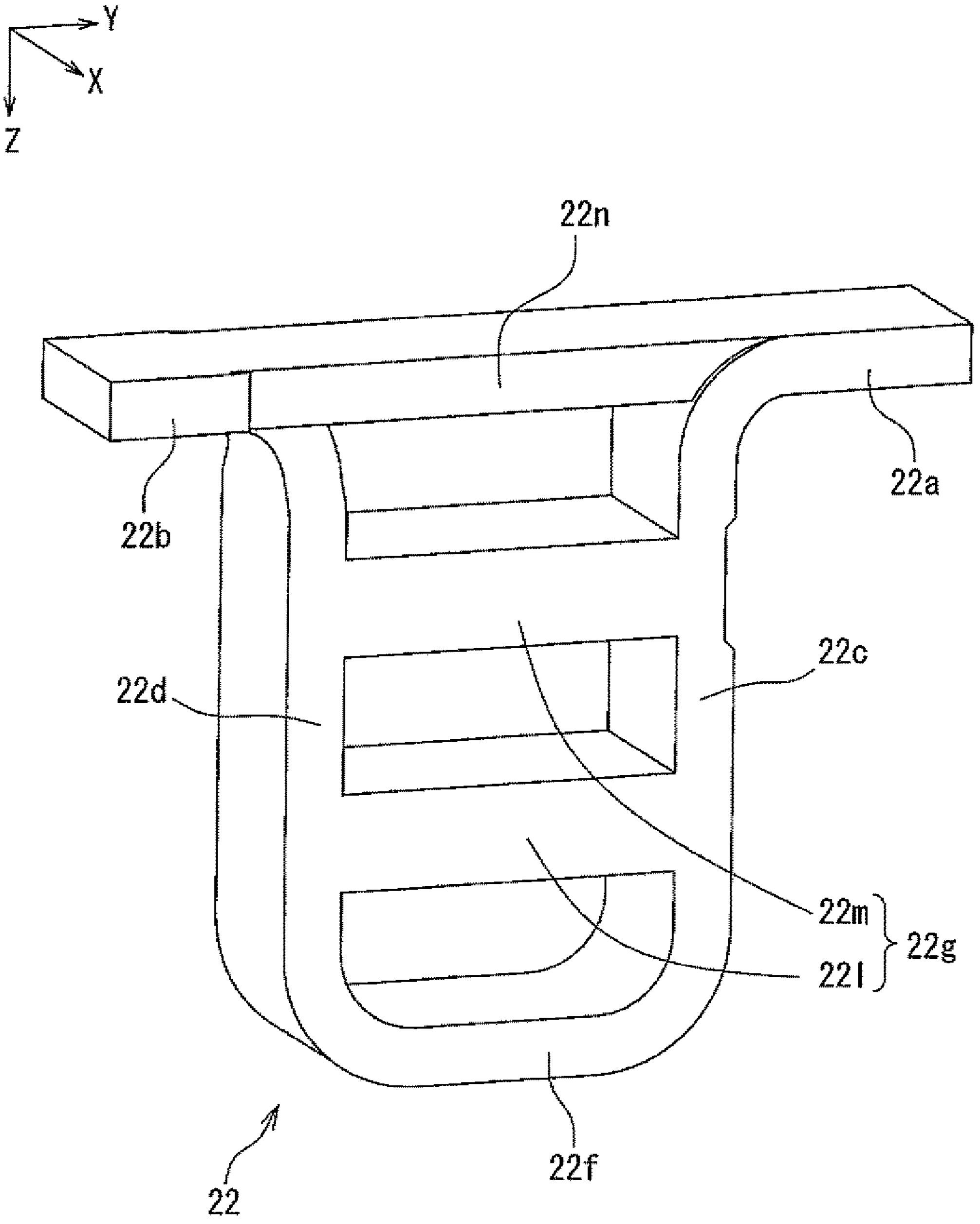
FIG. 9 is a perspective view of a male ground terminal according to Embodiment 5.

As illustrated in FIG. 9, the male ground terminal 22 includes the connection path 22*g* connecting the first lengthwise extending part 22*c* to the second lengthwise extending part 22*d* and extending in the lateral direction (transverse direction) along the laterally connecting part 22*f*. For example, the connection path 22*g* extends in the lateral direction (transverse direction) in parallel to the laterally connecting part 22*f*.

As illustrated in FIG. 9, the male ground terminal 22 includes, as the connection path 22*g*, two paths (a first path 221 and a second path 22*m*) separate from each other in the lengthwise direction (height direction). The first path 221 is positioned on a side closer to the laterally connecting part 22*f* with respect to the middle position between the laterally connecting part 22*f* and the laterally extending part 22*n*. The second path 22*m* is positioned on a side closer to the first male ground mounted part 22*a* and the second male ground mounted part 22*b* with respect to the middle position between the laterally connecting part 22*f* and the laterally extending part 22*n*. The first path 221 and the second path 22*m* physically connect the first lengthwise extending part 22*c* and the second lengthwise extending part 22*d*. In other words, the first path 221 and the second path 22*m* electrically connect the first lengthwise extending part 22*c* and the second lengthwise extending part 22*d*. The first path 221 and the second path 22*m* are flush with the first lengthwise extending part 22*c* and the second lengthwise extending part 22*d* in the alignment direction (longitudinal direction) of the male ground terminals 22, and they have the same thickness.

In the male ground terminal 22 having a U-shape illustrated in FIG. 9, the first lengthwise extending part 22*c*, the second lengthwise extending part 22*d*, the laterally connecting part 22*f*, the first path 221, and the second path 22*m* form a resonance path. In a cavity area surrounded in a U-shape by the first lengthwise extending part 22*c*, the second lengthwise extending part 22*d*, and the laterally connecting part 22*f*, a shielded area shielded by the first path 221 and the second path 22*m* increases. Thus, attenuation of cross talk can be achieved over a wider high-frequency band.

Therefore, in the male ground terminal 22 projecting in a U-shape in side view, by the connection path 22*g* being provided, the resonance path is formed by the first lengthwise extending part 22*c*, the second lengthwise extending part 22*d*, the laterally connecting part 22*f*, and the connection path 22*g* (the first path 221 and the second path 22*m*). Thus, sufficient isolation characteristics can be obtained without the connector being increased in size.

Male Ground Terminal According to Embodiment 6

A configuration and operation of the male ground terminal 22 according to Embodiment 6 of the male-type electrical connector 20 are described with reference to FIG. 10.

The male ground terminal 22 according to Embodiment 6 is described below, focusing on differences from the male ground terminal 22 according to Embodiment 5 illustrated in FIG. 9.

Figure 10:
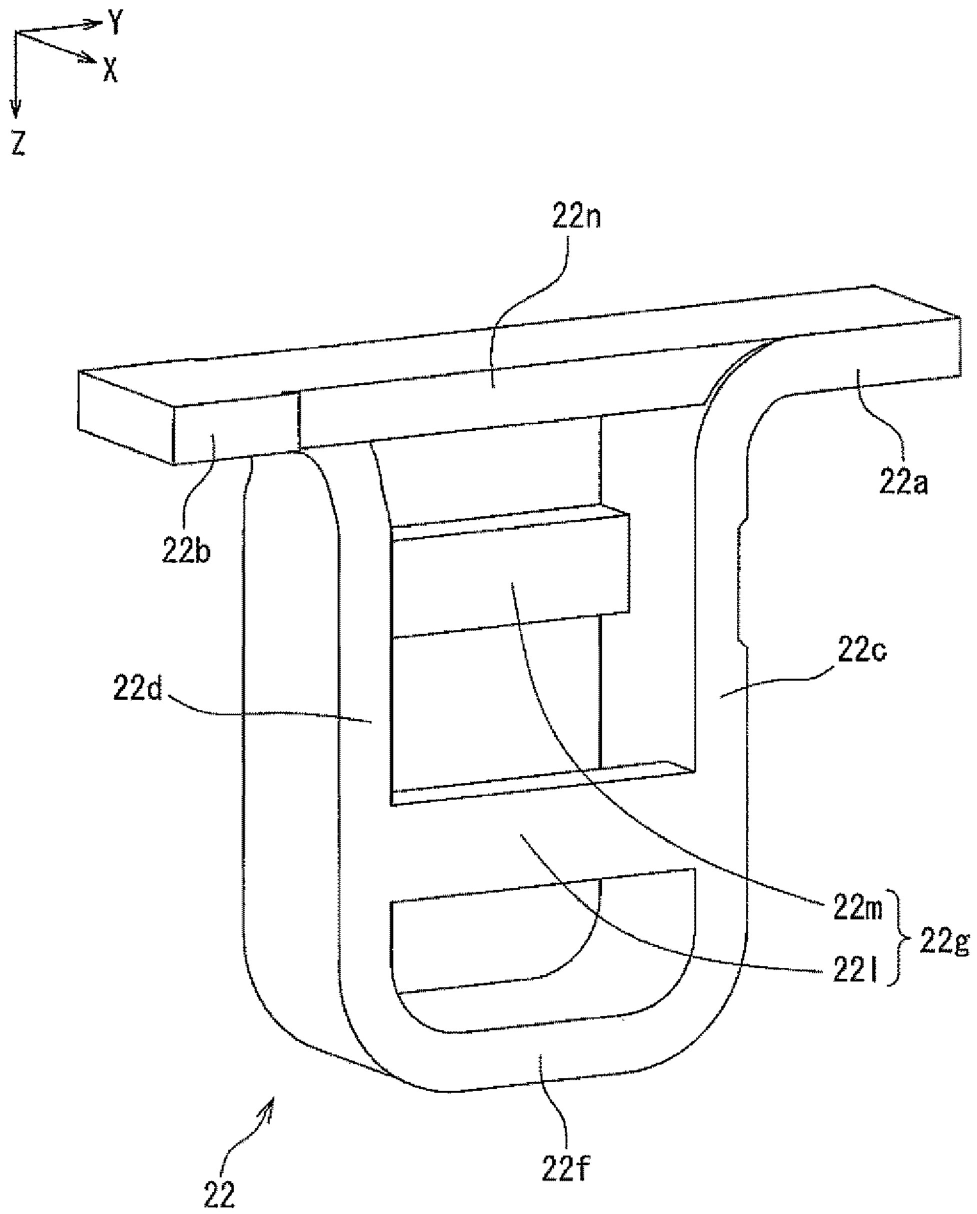
FIG. 10 is a perspective view of a male ground terminal according to Embodiment 6.

As illustrated in FIG. 10, the male ground terminal 22 includes the connection path 22*g* connecting the first lengthwise extending part 22*c* to the second lengthwise extending part 22*d* and extending in the lateral direction (transverse direction) along the laterally connecting part 22*f*. For example, the connection path 22*g* extends in the lateral direction (transverse direction) in parallel to the laterally connecting part 22*f*.

As illustrated in FIG. 10, the male ground terminal 22 includes, as the connection path 22*g*, two paths (the first path 221 and the second path 22*m*) separate from each other in the lengthwise direction (height direction). The first path 221 is positioned on a side closer to the laterally connecting part 22*f* with respect to the middle position between the laterally connecting part 22*f* and the laterally extending part 22*n*. The second path 22*m* is positioned on a side closer to the first male ground mounted part 22*a* and the second male ground mounted part 22*b* with respect to the middle position between the laterally connecting part 22*f* and the laterally extending part 22*n*. The first path 221 and the second path 22*m* physically connect the first lengthwise extending part 22*c* and the second lengthwise extending part 22*d*. In other words, the first path 221 and the second path 22*m* electrically connect the first lengthwise extending part 22*c* and the second lengthwise extending part 22*d*. The first path 221 is flush with the first lengthwise extending part 22*c* and the second lengthwise extending part 22*d* on a front side in a depth direction (longitudinal direction), but it is thinner than the first lengthwise extending part 22*c* and the second lengthwise extending part 22*d* (for example, a thickness of one third). The second path 22*m* is flush with the first lengthwise extending part 22*c* and the second lengthwise extending part 22*d* on a back side in the alignment direction (longitudinal direction) of the male ground terminals 22, but it is thinner than the first lengthwise extending part 22*c* and the second lengthwise extending part 22*d* (for example, a thickness of one third).

In the male ground terminal 22 having a U-shape illustrated in FIG. 10, resonance paths are formed respectively by the first lengthwise extending part 22*c*, the second lengthwise extending part 22*d*, the laterally connecting part 22*f*, and the first path 221 and by the first lengthwise extending part 22*c*, the second lengthwise extending part 22*d*, the laterally connecting part 22*f*, and the second path 22*m*. In a cavity area surrounded in a U-shape by the first lengthwise extending part 22*c*, the second lengthwise extending part 22*d*, and the laterally connecting part 22*f*, a shielded area shielded by the first path 221 and the second path 22*m* increases. Thus, attenuation of cross talk can be achieved over a wider high-frequency band.

Therefore, in the male ground terminal 22 projecting in a U-shape in side view, by the connection path 22*g* being provided, the resonance paths are formed respectively by the first lengthwise extending part 22*c*, the second lengthwise extending part 22*d*, the laterally connecting part 22*f*, and the first path (connection path) 221 and by the first lengthwise extending part 22*c*, the second lengthwise extending part 22*d*, the laterally connecting part 22*f*, and the second path (connection path) 22*m*. Thus, sufficient isolation characteristics can be obtained without the connector being increased in size.

Male Ground Terminal According to Embodiment 7

A configuration and operation of the male ground terminal 22 according to Embodiment 7 of the male-type electrical connector 20 are described with reference to FIG. 11.

The male ground terminal 22 according to Embodiment 7 is described below, focusing on differences from the male ground terminal 22 according to Embodiment 1 illustrated in FIG. 4.

Figure 11:
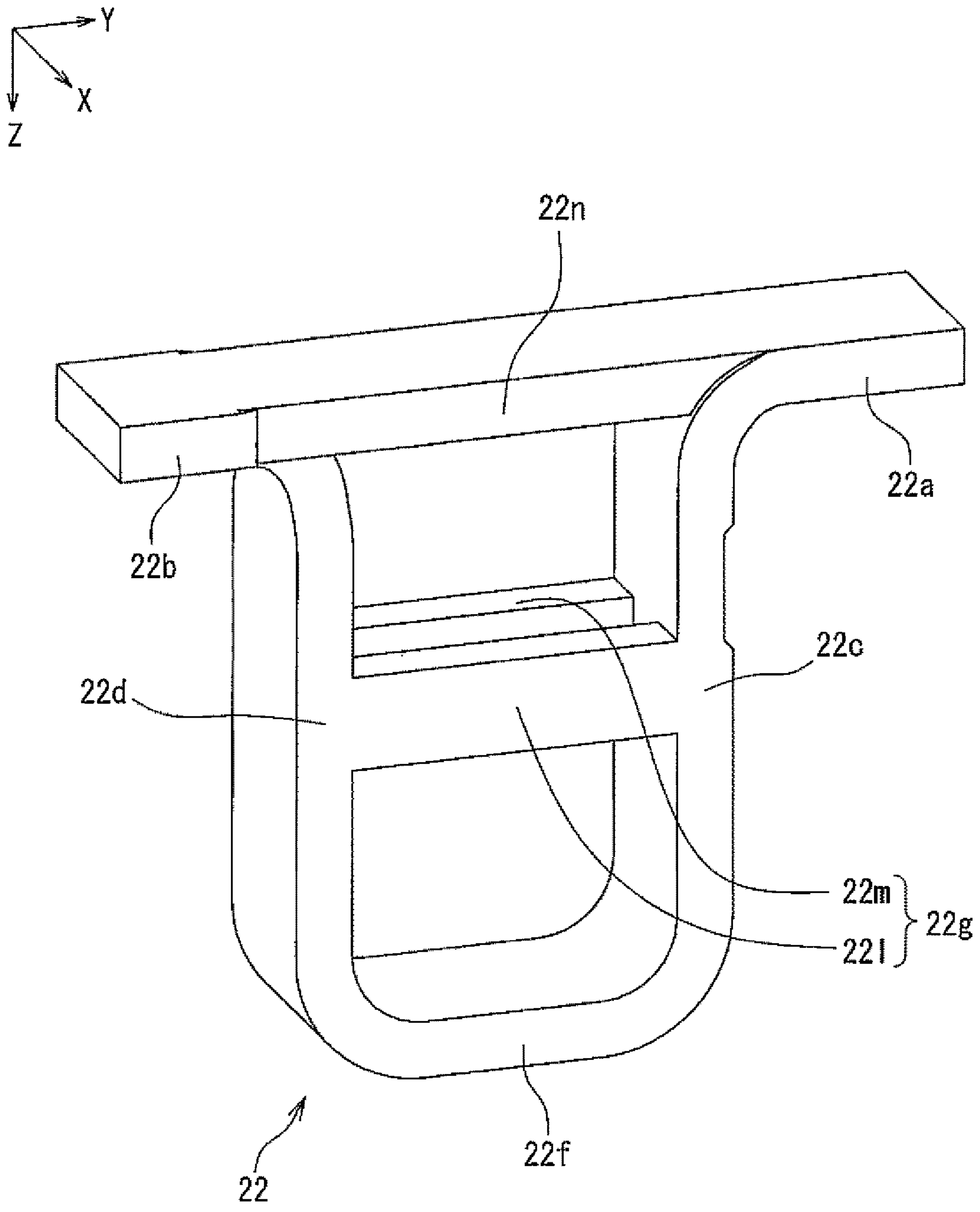
FIG. 11 is a perspective view of a male ground terminal according to Embodiment 7.

As illustrated in FIG. 11, the male ground terminal 22 includes the connection path 22*g* connecting the first lengthwise extending part 22*c* to the second lengthwise extending part 22*d* and extending in the lateral direction (transverse direction) along the laterally connecting part 22*f*. The connection path 22*g* is positioned almost at the center in the lengthwise direction (height direction), and electrically connects the first lengthwise extending part 22*c* and the second lengthwise extending part 22*d*. For example, the connection path 22*g* extends in the lateral direction (transverse direction) in parallel to the laterally connecting part 22*f*.

As illustrated in FIG. 11, the male ground terminal 22 includes, as the connection path 22*g*, two paths (the first path 221 and the second path 22*m*) separate from each other in the alignment direction (longitudinal direction) of the male ground terminals 22. Therefore, a degree of freedom of the connection path 22*g* increases. The first path 221 is positioned on the front side in the alignment direction (longitudinal direction) of the male ground terminals 22. The second path 22*m* is positioned on the back side in the alignment direction (longitudinal direction) of the male ground terminals 22. The first path 221 and the second path 22*m* physically connect the first lengthwise extending part 22*c* and the second lengthwise extending part 22*d*. In other words, the first path 221 and the second path 22*m* electrically connect the first lengthwise extending part 22*c* and the second lengthwise extending part 22*d*. The first path 221 is flush with the first lengthwise extending part 22*c* and the second lengthwise extending part 22*d* on the front side in the alignment direction (longitudinal direction) of the male ground terminals 22, but it is thinner than the first lengthwise extending part 22*c* and the second lengthwise extending part 22*d* (for example, a thickness of one third). The second path 22*m* is flush with the first lengthwise extending part 22*c* and the second lengthwise extending part 22*d* on the back side in the alignment direction (longitudinal direction) of the male ground terminals 22, but it is thinner than the first lengthwise extending part 22*c* and the second lengthwise extending part 22*d* (for example, a thickness of one third).

In the male ground terminal 22 having a U-shape illustrated in FIG. 11, resonance paths are formed respectively by the first lengthwise extending part 22*c*, the second lengthwise extending part 22*d*, the laterally connecting part 22*f*, and the first path 221 and by the first lengthwise extending part 22*c*, the second lengthwise extending part 22*d*, the laterally connecting part 22*f*, and the second path 22*m*.

Therefore, in the male ground terminal 22 projecting in a U-shape in side view, by the connection path 22*g* being provided, the resonance paths are formed respectively by the first lengthwise extending part 22*c*, the second lengthwise extending part 22*d*, the laterally connecting part 22*f*, and the first path (connection path) 221 and by the first lengthwise extending part 22*c*, the second lengthwise extending part 22*d*, the laterally connecting part 22*f*, and the second path (connection path) 22*m*. Thus, sufficient isolation characteristics can be obtained without the connector being increased in size.

Male Ground Terminal According to Embodiment 8

A configuration and operation of the male ground terminal 22 according to Embodiment 8 of the male-type electrical connector 20 are described with reference to FIG. 12.

The male ground terminal 22 according to Embodiment 8 is described below, focusing on differences from the male ground terminal 22 according to Embodiment 1 illustrated in FIG. 4.

Figure 12:
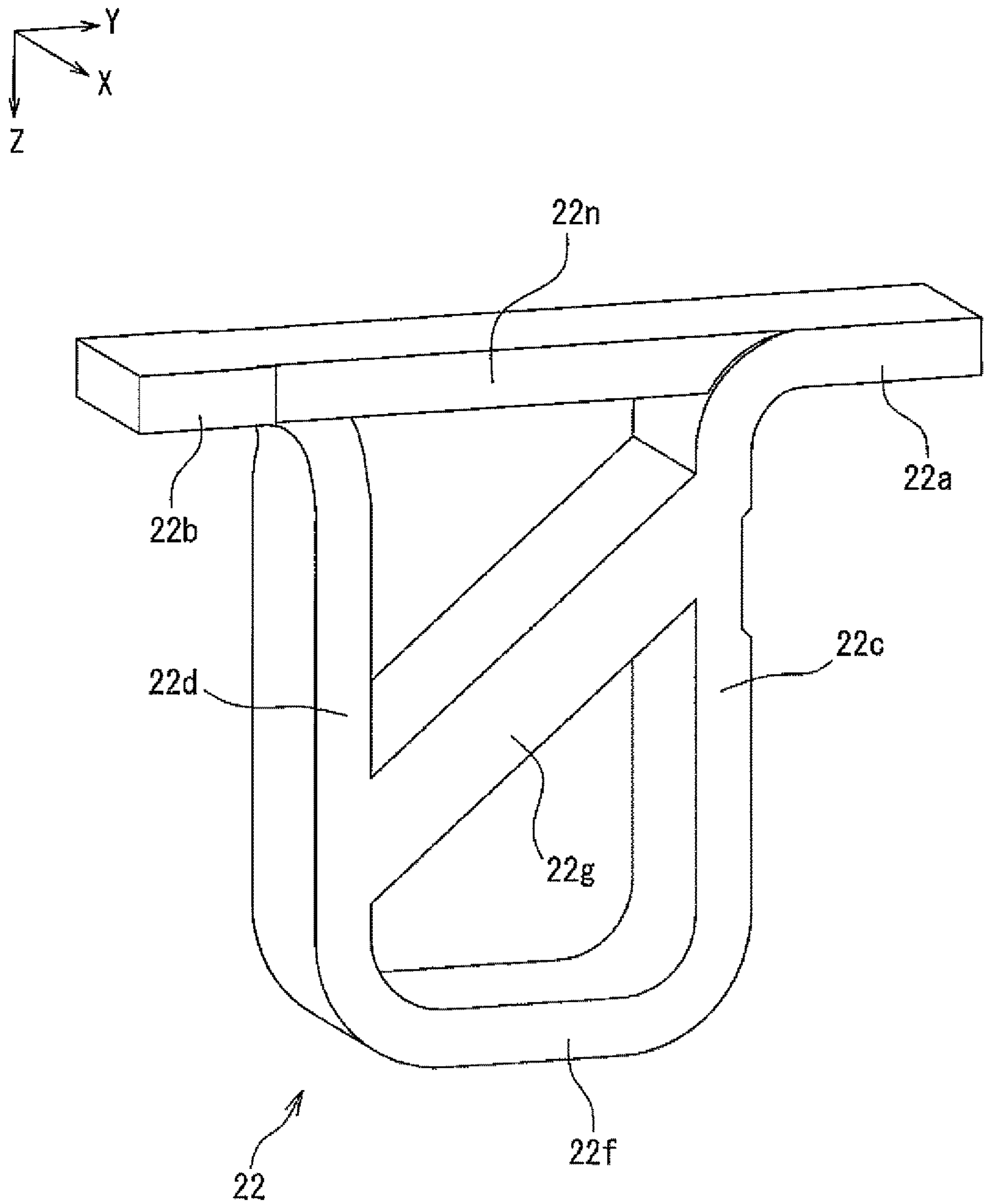
FIG. 12 is a perspective view of a male ground terminal according to Embodiment 8.

As illustrated in FIG. 12, the male ground terminal 22 includes the connection path 22*g* connecting the first lengthwise extending part 22*c* to the second lengthwise extending part 22*d* and extending to be inclined with respect to the laterally connecting part 22*f* in side view. For example, the connection path 22*g* extends obliquely downwardly from the first lengthwise extending part 22*c* to the second lengthwise extending part 22*d*. The connection path 22*g* is flush with the first lengthwise extending part 22*c* and the second lengthwise extending part 22*d* in the alignment direction (longitudinal direction) of the male ground terminals 22, and they have the same thickness.

As illustrated in FIG. 12, a first of the connection path 22*g* is positioned on a side closer to the first male ground mounted part 22*a* in the lengthwise direction (height direction), and a second of the connection path 22*g* is positioned on a side closer to the laterally connecting part 22*f* in the lengthwise direction (height direction). The connection path 22*g* extending to be inclined in side view physically connects the first lengthwise extending part 22*c* and the second lengthwise extending part 22*d*. In other words, the connection path 22*g* extending to be inclined in side view electrically connects the first lengthwise extending part 22*c* and the second lengthwise extending part 22*d*. In the male ground terminal 22 having a U-shape illustrated in FIG. 12, the first lengthwise extending part 22*c*, the second lengthwise extending part 22*d*, the laterally connecting part 22*f*, and the connection path 22*g* form a resonance path. In a cavity area surrounded in a U-shape by the first lengthwise extending part 22*c*, the second lengthwise extending part 22*d*, and the laterally connecting part 22*f*, a shielded area shielded by the connection path 22*g* extending to be inclined in side view increases. Thus, attenuation of cross talk can be achieved over a wider high-frequency band.

Therefore, in the male ground terminal 22 projecting in a U-shape in side view, by the connection path 22*g* being provided, the resonance path is formed by the first lengthwise extending part 22*c*, the second lengthwise extending part 22*d*, the laterally connecting part 22*f*, and the connection path 22*g*. Thus, sufficient isolation characteristics can be obtained without the connector being increased in size.

Male Ground Terminal According to Embodiment 9

A configuration and operation of the male ground terminal 22 according to Embodiment 9 of the male-type electrical connector 20 are described with reference to FIG. 13.

The male ground terminal 22 according to Embodiment 9 is described below, focusing on differences from the male ground terminal 22 according to Embodiment 7 illustrated in FIG. 11.

Figure 13:
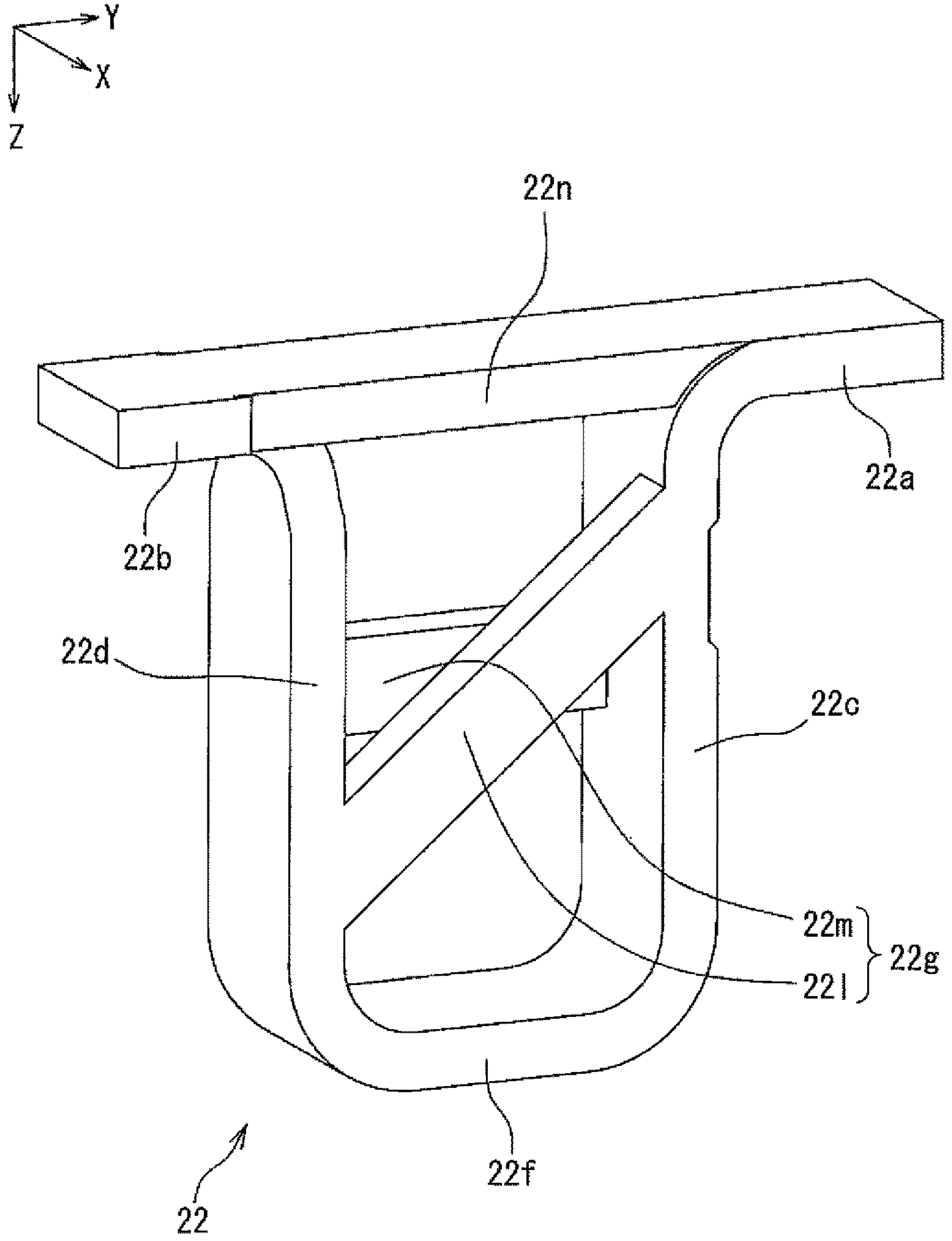
FIG. 13 is a perspective view of a male ground terminal according to Embodiment 9.

As illustrated in FIG. 13, the male ground terminal 22 includes the connection path 22*g* connecting the first lengthwise extending part 22*c* to the second lengthwise extending part 22*d*. The male ground terminal 22 includes, as the connection path 22*g*, two paths (the first path 221 and the second path 22*m*) separate from each other in the alignment direction (longitudinal direction) of the male ground terminals 22 and intersecting with each other in side view.

As illustrated in FIG. 13, the first path 221 is positioned on the front side in the alignment direction (longitudinal direction) of the male ground terminals 22, and extends obliquely downwardly from the first lengthwise extending part 22*c* to the second lengthwise extending part 22*d*. The first path 221 is flush with the first lengthwise extending part 22*c* and the second lengthwise extending part 22*d* on the front side in the alignment direction (longitudinal direction) of the male ground terminals 22, but it is thinner than the first lengthwise extending part 22*c* and the second lengthwise extending part 22*d* (for example, a thickness of one third).

The second path 22*m* is positioned almost at the center in the lengthwise direction (height direction) of the male ground terminal 22 on the back side in the alignment direction (longitudinal direction) of the male ground terminals 22. For example, the second path 22*m* extends in the lateral direction (transverse direction) in parallel to the laterally connecting part 22*f*. The second path 22*m* is flush with the first lengthwise extending part 22*c* and the second lengthwise extending part 22*d* on the back side in the depth direction (longitudinal direction), but it is thinner than the first lengthwise extending part 22*c* and the second lengthwise extending part 22*d* (for example, a thickness of one third).

The first path 221 and the second path 22*m* physically connect the first lengthwise extending part 22*c* and the second lengthwise extending part 22*d*. In other words, the first path 221 and the second path 22*m* electrically connect the first lengthwise extending part 22*c* and the second lengthwise extending part 22*d*.

In the male ground terminal 22 having a U-shape illustrated in FIG. 13, resonance paths are formed respectively by the first lengthwise extending part 22*c*, the second lengthwise extending part 22*d*, the laterally connecting part 22*f*, and the first path 221 and by the first lengthwise extending part 22*c*, the second lengthwise extending part 22*d*, the laterally connecting part 22*f*, and the second path 22*m*. In a cavity area surrounded in a U-shape by the first lengthwise extending part 22*c*, the second lengthwise extending part 22*d*, and the laterally connecting part 22*f*, a shielded area shielded by a portion where the first path 221 and the second path 22*m* do not intersect or overlap with each other (non-overlapping area) increases. Thus, attenuation of cross talk can be achieved over a wider high-frequency band.

Therefore, in the male ground terminal 22 projecting in a U-shape in side view, by the connection path 22*g* being provided, the resonance paths are formed respectively by the first lengthwise extending part 22*c*, the second lengthwise extending part 22*d*, the laterally connecting part 22*f*, and the first path (connection path) 221 and by the first lengthwise extending part 22*c*, the second lengthwise extending part 22*d*, the laterally connecting part 22*f*, and the second path (connection path) 22*m*. Thus, sufficient isolation characteristics can be obtained without the connector being increased in size.

Male Ground Terminal According to Embodiment 10

A configuration and operation of the male ground terminal 22 according to Embodiment 10 of the male-type electrical connector 20 are described with reference to FIG. 14.

The male ground terminal 22 according to Embodiment 10 is described below, focusing on differences from the male ground terminal 22 according to Embodiment 7 illustrated in FIG. 11.

Figure 14:
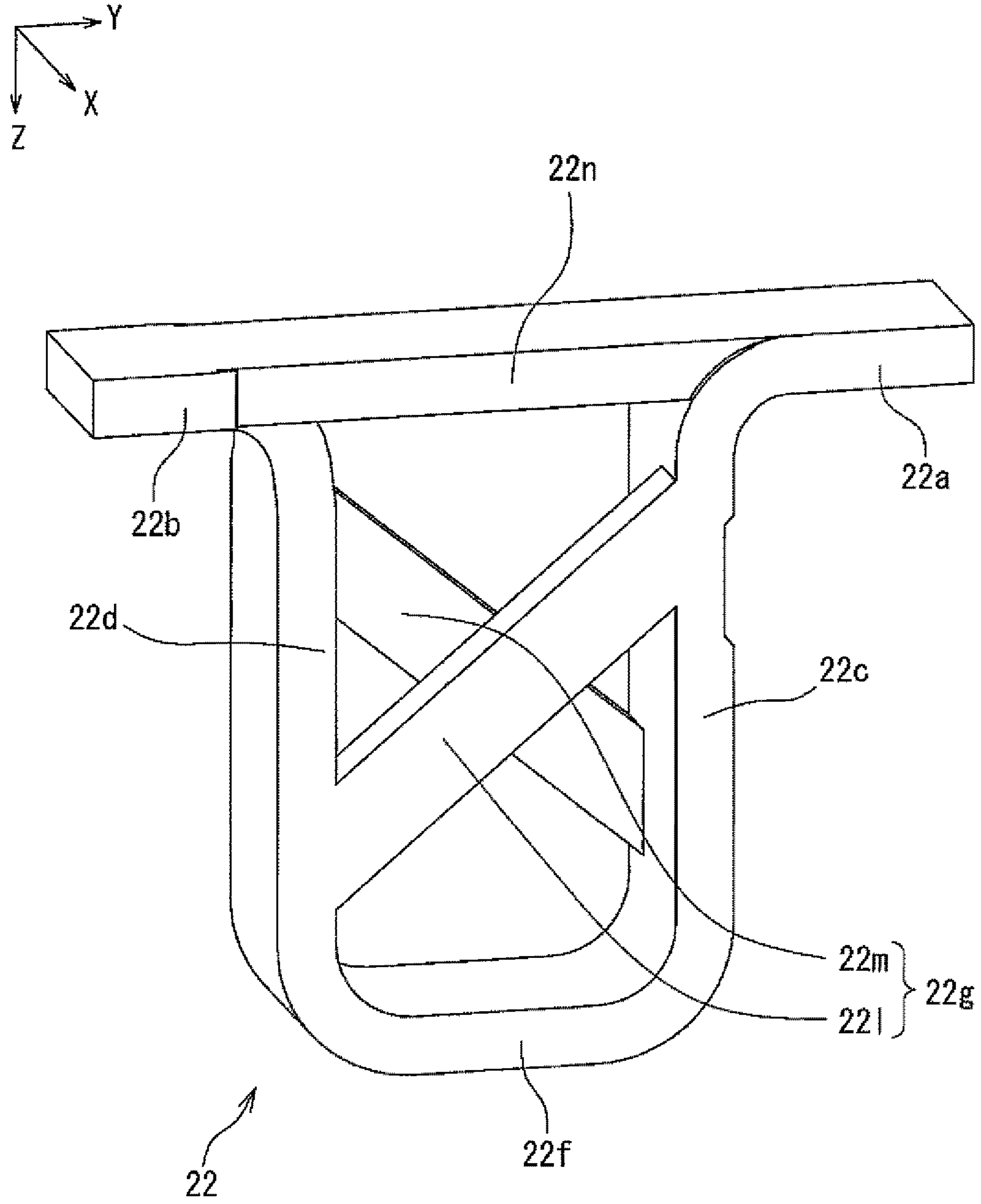
FIG. 14 is a perspective view of a male ground terminal according to Embodiment 10.

As illustrated in FIG. 14, the male ground terminal 22 includes the connection path 22*g* connecting the first lengthwise extending part 22*c* to the second lengthwise extending part 22*d*. The male ground terminal 22 includes, as the connection path 22*g*, two paths (the first path 221 and the second path 22*m*) separate from each other in the alignment direction (longitudinal direction) of the male ground terminals 22 and intersecting with each other in side view.

As illustrated in FIG. 14, the first path 221 is positioned on the front side in the alignment direction (longitudinal direction) of the male ground terminals 22, and extends obliquely downwardly from the first lengthwise extending part 22*c* to the second lengthwise extending part 22*d*. The first path 221 is flush with the first lengthwise extending part 22*c* and the second lengthwise extending part 22*d* on the front side in the alignment direction (longitudinal direction) of the male ground terminals 22, but it is thinner than the first lengthwise extending part 22*c* and the second lengthwise extending part 22*d* (for example, a thickness of one third).

The second path 22*m* is positioned on the back side in the alignment direction (longitudinal direction) of the male ground terminals 22, and extends obliquely upwardly from the first lengthwise extending part 22*c* to the second lengthwise extending part 22*d*. The second path 22*m* is flush with the first lengthwise extending part 22*c* and the second lengthwise extending part 22*d* on the back side in the alignment direction (longitudinal direction) of the male ground terminals 22, but it is thinner than the first lengthwise extending part 22*c* and the second lengthwise extending part 22*d* (for example, a thickness of one third).

The first path 221 and the second path 22*m* physically connect the first lengthwise extending part 22*c* and the second lengthwise extending part 22*d*. In other words, the first path 221 and the second path 22*m* electrically connect the first lengthwise extending part 22*c* and the second lengthwise extending part 22*d*.

In the male ground terminal 22 having a U-shape illustrated in FIG. 14, resonance paths are formed respectively by the first lengthwise extending part 22*c*, the second lengthwise extending part 22*d*, the laterally connecting part 22*f*, and the first path 221 and by the first lengthwise extending part 22*c*, the second lengthwise extending part 22*d*, the laterally connecting part 22*f*, and the second path 22*m*. In a cavity area surrounded in a U-shape by the first lengthwise extending part 22*c*, the second lengthwise extending part 22*d*, and the laterally connecting part 22*f*, a shielded area shielded by a portion where the first path 221 and the second path 22*m* do not intersect or overlap with each other (non-overlapping area) increases. Thus, attenuation of cross talk can be achieved over a wider high-frequency band.

Therefore, in the male ground terminal 22 projecting in a U-shape in side view, by the connection path 22*g* being provided, the resonance paths are formed respectively by the first lengthwise extending part 22*c*, the second lengthwise extending part 22*d*, the laterally connecting part 22*f*, and the first path (connection path) 221 and by the first lengthwise extending part 22*c*, the second lengthwise extending part 22*d*, the laterally connecting part 22*f*, and the second path (connection path) 22*m*. Thus, sufficient isolation characteristics can be obtained without the connector being increased in size.

Male Ground Terminal According to Embodiment 11

A configuration and operation of the male ground terminal 22 according to Embodiment 11 of the male-type electrical connector 20 are described with reference to FIG. 15.

The male ground terminal 22 according to Embodiment 11 is described below, focusing on differences from the male ground terminal 22 according to Embodiment 1 illustrated in FIG. 4.

Figure 15:
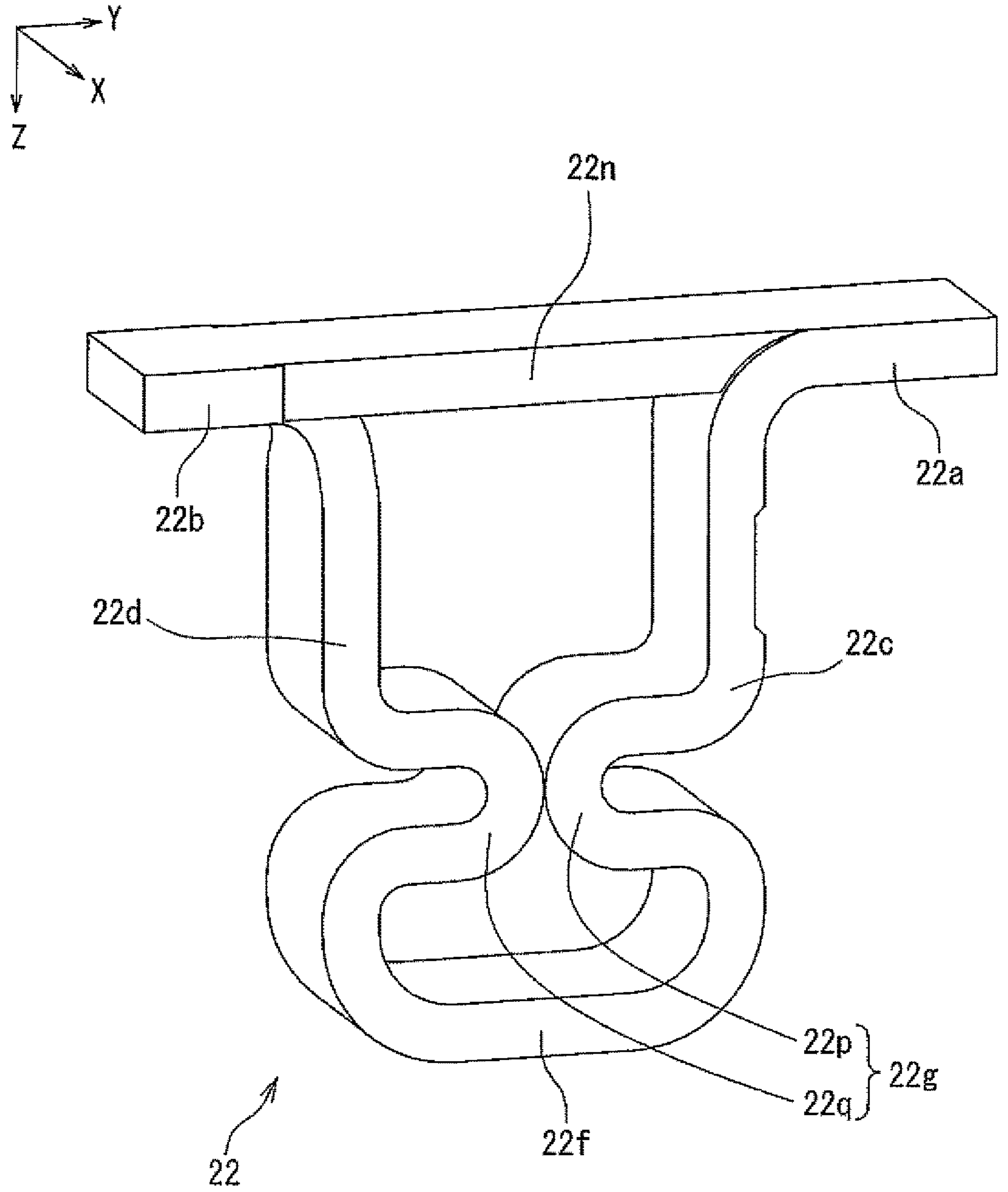
FIG. 15 is a perspective view of a male ground terminal according to Embodiment 11.

As illustrated in FIG. 15, the male ground terminal 22 includes, as the connection path 22*g*, a first curved path 22*p* and a second curved path 22*q*. The first curved path 22*p* is positioned almost at a central portion on the first lengthwise extending part 22*c* side, and projects in a U-shape toward the second lengthwise extending part 22*d*. The second curved path 22*q* is positioned almost at a central portion on the second lengthwise extending part 22*d* side, and projects in a U-shape toward the first lengthwise extending part 22*c*. The first curved path 22*p* and the second curved path 22*q* are flush with the first lengthwise extending part 22*c* and the second lengthwise extending part 22*d* in the alignment direction (longitudinal direction) of the male ground terminals 22, and they have the same thickness.

The first curved path 22*p* and the second curved path 22*q* physically contact each other, thus physically connecting the first lengthwise extending part 22*c* and the second lengthwise extending part 22*d*. Further, the first curved path 22*p* and the second curved path 22*q* may be physically separate from each other by having a small space therebetween in the lateral direction (transverse direction). In this case, the first curved path 22*p* and the second curved path 22*q* electrically connect the first lengthwise extending part 22*c* and the second lengthwise extending part 22*d* in a high-frequency band (for example, in a GHz band) by capacitive coupling.

In the male ground terminal 22 having a U-shape illustrated in FIG. 15, the first lengthwise extending part 22*c*, the second lengthwise extending part 22*d*, the laterally connecting part 22*f*, and the first curved path 22*p* and the second curved path 22*q* (connection path 22*g*) form a resonance path. In a cavity area surrounded in a U-shape by the first lengthwise extending part 22*c*, the second lengthwise extending part 22*d*, and the laterally connecting part 22*f*, a shielded area shielded by the first curved path 22*p* and the second curved path 22*q* increases. Thus, attenuation of cross talk can be achieved over a wider high-frequency band.

Therefore, in the male ground terminal 22 projecting in a U-shape in side view, by the connection path 22*g* being provided, the resonance path is formed by the first lengthwise extending part 22*c*, the second lengthwise extending part 22*d*, the laterally connecting part 22*f*, and the connection path 22*g*. Thus, sufficient isolation characteristics can be obtained without the connector being increased in size.

Female Ground Terminal According to Embodiment 12

Figure 18:
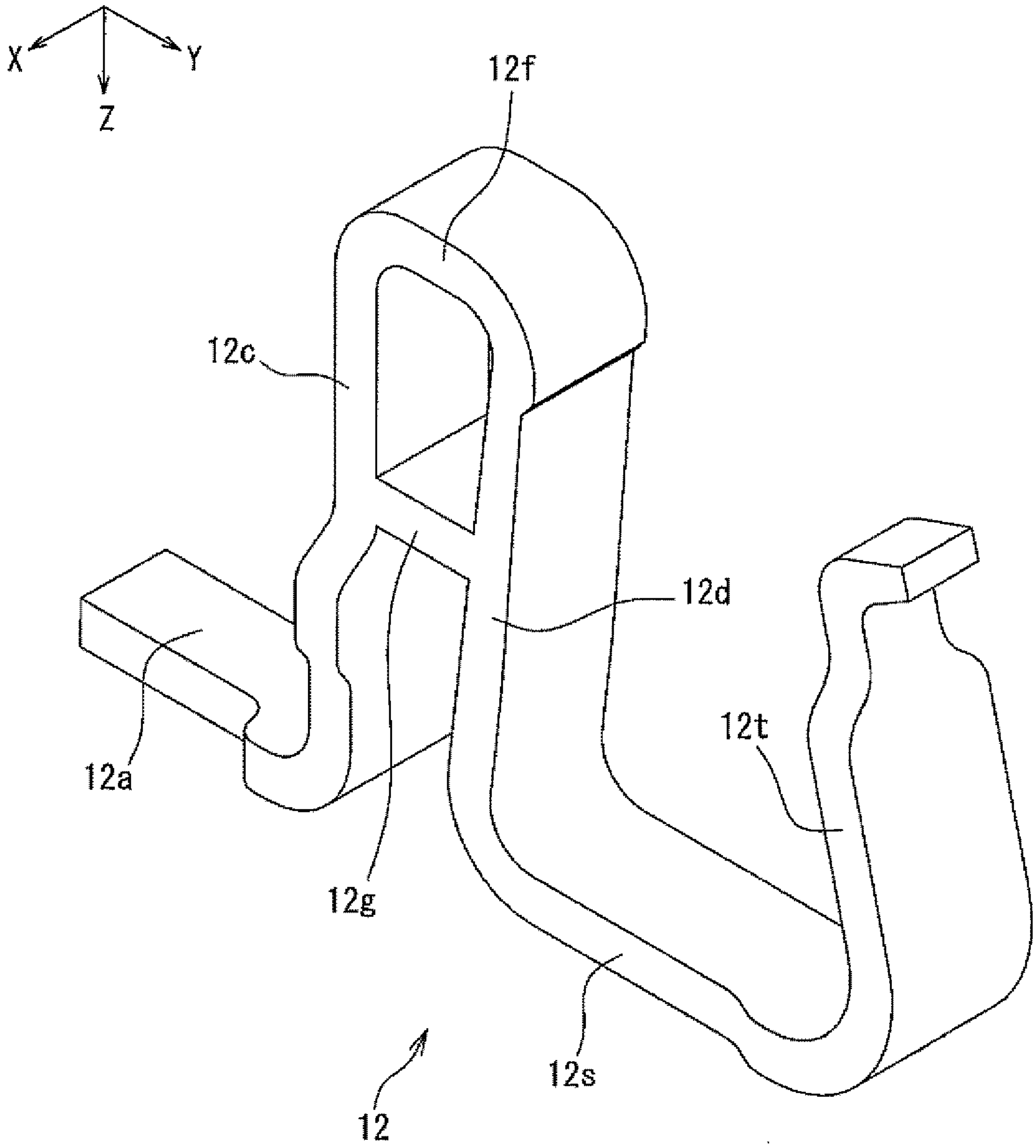
FIG. 18 is a perspective view of a female ground terminal according to Embodiment 12.
Figure 19:
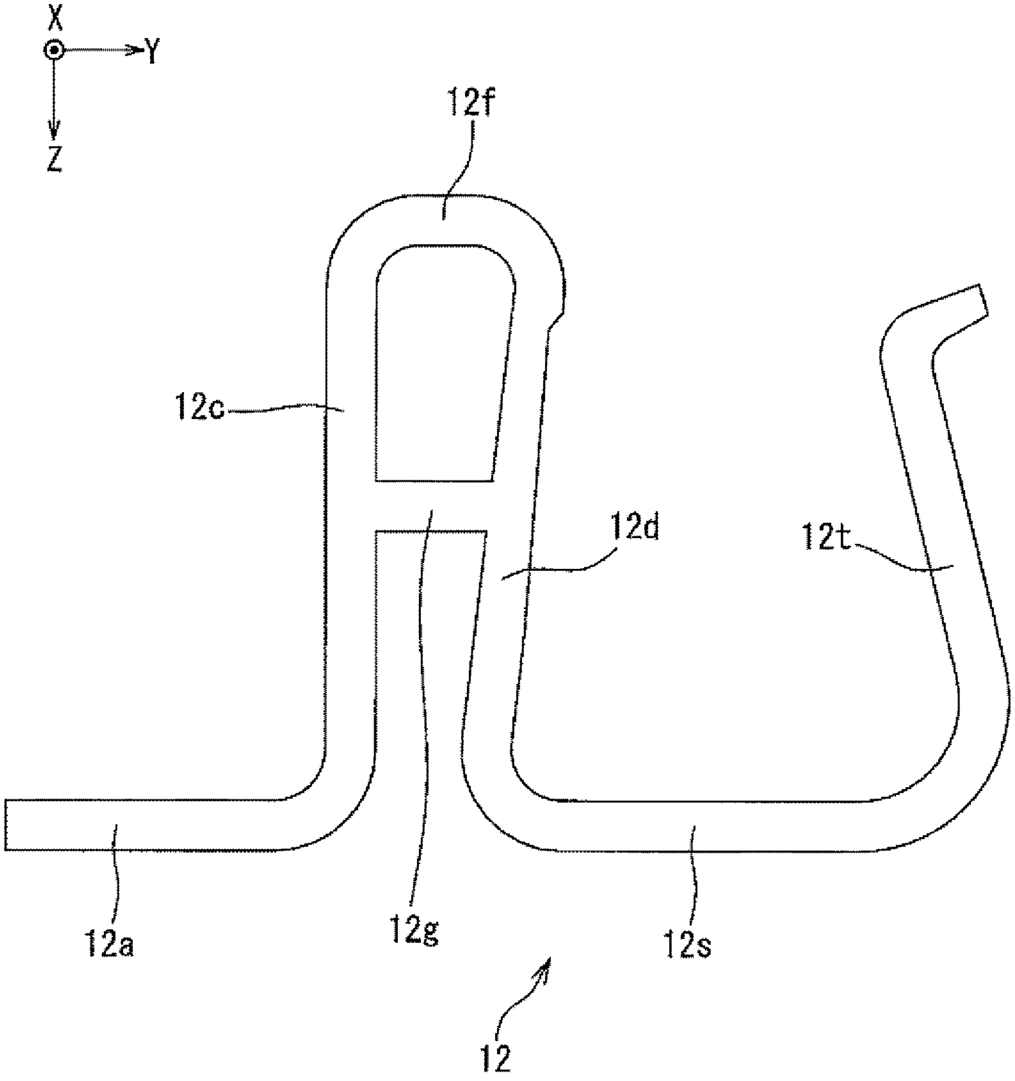
FIG. 19 is a side view of the female ground terminal illustrated in FIG. 18.

A configuration and operation of the female ground terminal 12 according to Embodiment 12 of the female-type electrical connector 10 are described with reference to FIGS. 18 and 19. FIG. 18 is a perspective view of the female ground terminal 12 according to Embodiment 12. FIG. 19 is a side view of the female ground terminal 12 illustrated in FIG. 18.

As illustrated in FIGS. 18 and 19, the female ground terminal 12 includes a part projecting upwardly (in a negative direction in the Z-axis direction) in a U-shape and a part projecting downwardly (in a positive direction in the Z-axis direction) in a U-shape in side view. The female ground terminal 12 includes the female ground mounted part 12*a*, a first lengthwise extending part 12*c*, a second lengthwise extending part 12*d*, a laterally connecting part 12*f*, a connection path 12*g*, a laterally extending part 12*s*, and a third lengthwise extending part 12*t*.

The female ground mounted part 12*a* is positioned on the lower side and on the first side in FIG. 18. The female ground mounted part 12*a* is opposed to the first male ground mounted part 22*a* when the female ground terminal 12 and the male ground terminal 22 are mated together. The female ground mounted part 12*a* extends in the lateral direction (transverse direction) orthogonal to the alignment direction of the female ground terminals 12.

The first lengthwise extending part 12*c* is connected to the female ground mounted part 12*a*, is positioned on the first side, and extends in the lengthwise direction (height direction). The second lengthwise extending part 12*d* is positioned on the second side to be opposed to the first lengthwise extending part 12*c*, and extends in the lengthwise direction (height direction).

The laterally connecting part 12*f* connects an end portion of the first lengthwise extending part 12*c* on the opposite side from the female ground mounted part 12*a* (on the upper side in FIG. 18) to an end portion of the second lengthwise extending part 12*d* on the opposite side from the laterally extending part 12*s* (on the upper side in FIG. 18), and extends in the lateral direction (transverse direction) orthogonal to the alignment direction of the female ground terminals 12. The first lengthwise extending part 12*c*, the laterally connecting part 12*f*, and the second lengthwise extending part 12*d* form a part projecting upwardly (in the negative direction in the Z-axis direction) in a U-shape.

The third lengthwise extending part 12*t* is positioned on the opposite side from the female ground mounted part 12*a* in the lateral direction (transverse direction) of the female ground terminal 12, and extends in the lengthwise direction (height direction).

The laterally extending part 12*s* connects the second lengthwise extending part 12*d* to the third lengthwise extending part 12*t*, and extends in the lateral direction (transverse direction). The second lengthwise extending part 12*d*, the laterally extending part 12*s*, and the third lengthwise extending part 12*t* form a part projecting downwardly (in the positive direction in the Z-axis direction) in a U-shape. When the female ground terminal 12 and the male ground terminal 22 are mated together, the second lengthwise extending part 12*d* and the third lengthwise extending part 12*t* elastically pinch the first lengthwise extending part 22*c* and the second lengthwise extending part 22*d*. Therefore, in the mated state of the electrical connector set 1, the male ground terminal 22 is engaged with the female ground terminal 12, and electrical connection between the female ground terminal 12 and the male ground terminal 22 is formed.

The connection path 12*g* connects the first lengthwise extending part 12*c* to the second lengthwise extending part 12*d*, and extends in the lateral direction (transverse direction) along the laterally connecting part 12*f* in side view. Therefore, a frequency at which an attenuation pole appears can be easily controlled. For example, the connection path 12*g* extends in the lateral direction (transverse direction) in parallel to the laterally connecting part 12*f*. The connection path 12*g* is located between the laterally connecting part 12*f* and the laterally extending part 12*s* in the lengthwise direction (height direction). The connection path 12*g* is flush with the first lengthwise extending part 12*c* and the second lengthwise extending part 12*d* in the alignment direction (longitudinal direction) of the female ground terminals 12. Therefore, making the female ground terminal 12 having the connection path 12*g* becomes easier.

For example, as illustrated in FIG. 19, the connection path 12*g* is positioned almost at the middle between the laterally connecting part 12*f* and the laterally extending part 12*s* in the lengthwise direction (height direction), and physically connects the first lengthwise extending part 12*c* and the second lengthwise extending part 12*d*. In other words, the connection path 12*g* is positioned almost at the center of the female ground terminal 12 in the lengthwise direction (height direction), and electrically connects the first lengthwise extending part 12*c* and the second lengthwise extending part 12*d*. At a part of the female ground terminal 12 projecting upwardly (in the negative direction in the Z-axis direction) in a U-shape in side view illustrated in FIGS. 18 and 19, a resonance path is formed by the first lengthwise extending part 12*c*, the second lengthwise extending part 12*d*, the laterally connecting part 12*f*, and the connection path 12*g*.

Therefore, in the female ground terminal 12, by the connection path 12*g* being provided, the resonance path is formed by the first lengthwise extending part 12*c*, the second lengthwise extending part 12*d*, the laterally connecting part 12*f*, and the connection path 12*g*. Thus, sufficient isolation characteristics can be obtained without the connector being increased in size.

Although the concrete embodiments of the present disclosure are described above, the present disclosure is not limited to the embodiments, but may be embodied by the embodiments which are variously changed within the scope of the present disclosure.

In the above disclosure, the male ground terminal 22 includes the laterally extending part 22*n*. However, it is possible that the male ground terminal 22 does not include the laterally extending part 22*n*.

In the above disclosure, bending and punching are illustrated as a forming method for the male ground terminal 22 having the connection path 22*g*. However, the male ground terminal 22 having the connection path 22*g* may be formed through etching, welding, or the like.

In the above disclosure, the connection path 22*g* has the gap 22*j* in Embodiment 4 illustrated in FIG. 8. However, the connection path 22*g* may have the gap 22*j* in each embodiment illustrated in FIG. 6, 7, 9, 10, 11, 12, 13, or 14.

In the above disclosure, for example as illustrated in FIG. 5, the shape of the frame of the male ground terminal 22 and the shape of the male signal terminal 25 are different from each other. However, the shape of the frame of the male ground terminal 22 and the shape of the male signal terminal 25 may be the same (for example, in a U-shape). Thus, the male ground terminal 22 and the signal terminal 25 can be made at low cost.

In the above disclosure, the male signal terminals 25 and the male ground terminals 22 are disposed alternately. However, for example, the male signal terminal 25, the male ground terminal 22, the male ground terminal 22, and the male signal terminal 25 may be disposed in order.

In the above disclosure, the connection path 12*g* provided to the female ground terminal 12 is positioned almost at the middle between the laterally connecting part 12*f* and the laterally extending part 12*s* in the lengthwise direction (height direction), and physically connects the first lengthwise extending part 12*c* and the second lengthwise extending part 12*d*. However, the connection structure of the connection path 12*g* may be similar to the connection structure of the connection path 22*g* of the male ground terminal 22, that is, one of the connection structures of Embodiment 2 illustrated in FIG. 6 to Embodiment 11 illustrated in FIG. 15.

The present disclosure and embodiments can be summarized as follows.

The electrical connector 20 according to one aspect of the present disclosure includes the electrically-insulating holding member 21, and the signal terminal 25 and the male ground terminal 22 held by the holding member 21. The male ground terminal 22 is disposed next to the signal terminal 25. The male ground terminal 22 includes the first lengthwise extending part 22*c*, the second lengthwise extending part 22*d* opposed to the first lengthwise extending part 22*c*, and the laterally connecting part 22*f* connecting the end portion of the first lengthwise extending part 22*c* and the end portion of the second lengthwise extending part 22*d*. The male ground terminal 22 projects in side view. The male ground terminal 22 includes the connection path 22*g* configured to electrically connect the first lengthwise extending part 22*c* and the second lengthwise extending part 22*d*.

In this configuration, in the male ground terminal 22 projecting in side view, the first lengthwise extending part 22*c*, the second lengthwise extending part 22*d*, the laterally connecting part 22*f*, and the connection path 22*g* form the resonance path. Thus, sufficient isolation characteristics can be obtained without the connector being increased in size.

Further, in the electrical connector 20 according to one embodiment, the connection path 22*g* extends along the laterally connecting part 22*f* in side view.

In this embodiment, a frequency at which an attenuation pole appears can be easily controlled.

Further, in the electrical connector 20 according to one embodiment, the connection path 22*g* extends to be inclined with respect to the laterally connecting part 22*f* in side view.

In this embodiment, in the cavity area surrounded by the first lengthwise extending part 22*c*, the second lengthwise extending part 22*d*, and the laterally connecting part 22*f*, the shielded area shielded by the connection path 22*g* extending to be inclined in side view increases. Thus, attenuation of cross talk can be achieved over a wider high-frequency band.

Further, in the electrical connector 20 according to one embodiment, the connection path 22*g* is flush with the first lengthwise extending part 22*c* and the second lengthwise extending part 22*d* in the alignment direction of the male ground terminals 22.

In this embodiment, making the male ground terminal 22 having the connection path 22*g* becomes easier.

Further, in the electrical connector 20 according to one embodiment, the connection path 22*g* includes the first path 221 and the second path 22*m* separate from each other in the alignment direction of the male ground terminals 22.

In this embodiment, a degree of freedom of the connection path 22*g* increases.

Further, in the electrical connector 20 according to one embodiment, the laterally extending part 22*n* connecting the first male ground mounted part 22*a* connected to the first lengthwise extending part 22*c* and the second male ground mounted part 22*b* connected to the second lengthwise extending part 22*d* is further included.

In this embodiment, by the laterally extending part 22*n* being added, another resonance path constituted by the first lengthwise extending part 22*c*, the second lengthwise extending part 22*d*, the connection path 22*g*, and the laterally extending part 22*n* is formed.

Further, in the electrical connector 20 according to one embodiment, the connection path 22*g* has the gap 22*j* that allows electrical connection at an intermediate part thereof.

In this embodiment, when the connection path 22*g* is physically separated by the small gap 22*j* being provided therein, the connection path 22*g* establishes electrical connection in a high-frequency band (for example, in a GHz band). Therefore, a degree of freedom of the connection path 22*g* increases.

Further, in the electrical connector 20 according to one embodiment, the shape of the signal terminal 25 and the shape of the male ground terminal 22 are the same as each other.

In this embodiment, the male ground terminal 22 and the signal terminal 25 can be made at low cost.

The electrical connector set 1 according to one aspect of the present disclosure includes the above-described electrical connector 20 and the opposing electrical connector 10 having the female ground terminal 12 configured to be insertably and removably engaged with the male ground terminal 22 of the electrical connector 20.

In this configuration, in the male ground terminal 22 projecting in side view, the first lengthwise extending part 22*c*, the second lengthwise extending part 22*d*, the laterally connecting part 22*f*, and the connection path 22*g* form the resonance path. Thus, the electrical connector set 1 capable of obtaining sufficient isolation characteristics without the connector being increased in size can be provided.

The electrical connector 10 according to one aspect of the present disclosure includes the electrically-insulating holding member 11, and the female signal terminal 15 and the female ground terminal 12 held by the holding member 11. The female ground terminal 12 is disposed next to the female signal terminal 15. The female ground terminal 12 includes the first lengthwise extending part 12*c*, the second lengthwise extending part 12*d* opposed to the first lengthwise extending part 12*c*, the laterally connecting part 12*f* connecting the end portion of the first lengthwise extending part 12*c* and the end portion of the second lengthwise extending part 12*d*, the third lengthwise extending part 12*t* opposed to the second lengthwise extending part 12*d*, and the laterally extending part 12*s* connecting the end portion of the second lengthwise extending part 12*d* and the end portion of the third lengthwise extending part 12*t*. The female ground terminal 12 projects in side view. The female ground terminal 12 includes the connection path 12*g* configured to electrically connect the first lengthwise extending part 12*c* and the second lengthwise extending part 12*d*.

In this configuration, in the part of the female ground terminal 12 projecting upwardly (in the negative direction in the Z-axis direction) in a U-shape in side view, by the connection path 12*g* being provided, the resonance path is formed by the first lengthwise extending part 12*c*, the second lengthwise extending part 12*d*, the laterally connecting part 12*f*, and the connection path 12*g*. Therefore, sufficient isolation characteristics can be obtained without the connector being increased in size.

What is claimed is:

1. An electrical connector set comprising:

a holding member that is electrically insulating;

a signal terminal and a male ground terminal held by the holding member; and an opposing electrical connector having a female ground terminal configured to insertably and removably engage with the male ground terminal of the electrical connector, wherein the male ground terminal is disposed next to the signal terminal, the male ground terminal includes a first extending part, a second extending part opposed to the first extending part, and a laterally connecting part connecting an end portion of the first extending part and an end portion of the second extending part, the male ground terminal projecting in side view, the male ground terminal includes a connection path configured to electrically connect the first extending part and the second extending part, and the female ground terminal has a U-shaped portion into which the male ground terminal can be inserted and removed.

2. The electrical connector set according to claim 1, wherein the connection path extends along the laterally connecting part in side view.

3. The electrical connector set according to claim 2, wherein the connection path is flush with the first extending part and the second extending part in an alignment direction of the male ground terminal.

4. The electrical connector set according to claim 2, wherein the connection path includes a first path and a second path separate from each other in an alignment direction of the male ground terminal.

5. The electrical connector set according to claim 2, wherein a laterally extending part connecting a first male ground mounted part connected to the first extending part and a second male ground mounted part connected to the second extending part is further included.

6. The electrical connector set according to claim 2, wherein the connection path has a gap that allows electrical connection at an intermediate part of the connection path.

7. The electrical connector set according to claim 2, wherein a shape of the signal terminal and a shape of the male ground terminal are same as each other.

8. The electrical connector set according to claim 1, wherein the connection path is flush with the first extending part and the second extending part in an alignment direction of the male ground terminal.

9. The electrical connector set according to claim 1, wherein the connection path includes a first path and a second path separate from each other in an alignment direction of the male ground terminal.

10. The electrical connector set according to claim 1, wherein a laterally extending part connecting a first male ground mounted part connected to the first extending part and a second male ground mounted part connected to the second extending part is further included.

11. The electrical connector set according to claim 1, wherein the connection path has a gap that allows electrical connection at an intermediate part of the connection path.

12. The electrical connector set according to claim 1, wherein a shape of the signal terminal and a shape of the male ground terminal are the same as each other.

13. An electrical connector comprising:

a holding member that is electrically insulating; and a signal terminal and a male ground terminal held by the holding member, wherein the male ground terminal is disposed next to the signal terminal, the male ground terminal includes a first extending part, a second extending part opposed to the first extending part, and a laterally connecting part connecting an end portion of the first extending part and an end portion of the second extending part, the male ground terminal projecting in side view, and the male ground terminal includes a connection path configured to electrically connect the first extending part and the second extending part, wherein the connection path extends inclined with respect to the laterally connecting part in side view.

14. The electrical connector according to claim 13, wherein the connection path is flush with the first extending part and the second extending part in an alignment direction of the male ground terminal.

15. The electrical connector according to claim 13, wherein the connection path includes a first path and a second path separate from each other in an alignment direction of the male ground terminal.

16. The electrical connector according to claim 13, wherein a laterally extending part connecting a first male ground mounted part connected to the first extending part and a second male ground mounted part connected to the second extending part is further included.

17. The electrical connector according to claim 13, wherein the connection path has a gap that allows electrical connection at an intermediate part of the connection path.

18. An electrical connector comprising:

a holding member that is electrically insulating; and a female signal terminal and a female ground terminal held by the holding member, wherein the female ground terminal is disposed next to the female signal terminal, the female ground terminal includes a first extending part, a second extending part opposed to the first extending part, a laterally connecting part connecting an end portion of the first extending part and an end portion of the second extending part, a third extending part opposed to the second extending part, and a laterally extending part connecting an end portion of the second extending part and an end portion of the third extending part, the female ground terminal projecting in side view, and the female ground terminal includes a connection path configured to electrically connect the first extending part and the second extending part.

* * * * *